US006687228B1

(12) United States Patent
Fichou et al.

(10) Patent No.: US 6,687,228 B1
(45) Date of Patent: Feb. 3, 2004

(54) METHOD AND SYSTEM IN A PACKET SWITCHING NETWORK FOR DYNAMICALLY SHARING THE BANDWIDTH OF A VIRTUAL PATH CONNECTION AMONG DIFFERENT TYPES OF CONNECTIONS

(75) Inventors: Aline Fichou, La Colle sur Loup (FR); Claude Galand, La Colle sur Loup (FR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/438,054

(22) Filed: Nov. 10, 1999

(30) Foreign Application Priority Data

Nov. 10, 1998 (EP) ............................................. 98480077

(51) Int. Cl.⁷ .................................................. H04J 1/16
(52) U.S. Cl. ...................................... 370/232; 370/395
(58) Field of Search ................................ 370/230–238, 370/255, 429–438, 395.51; 359/395, 468, 412, 400, 218, 352–355; 455/450–453; 412/395.43; 428/398, 458; 711/209; 712/234

(56) References Cited

U.S. PATENT DOCUMENTS

| | | | | |
|---|---|---|---|---|
| 5,978,357 A | * | 11/1999 | Charny | 370/231 |
| 6,301,267 B1 | * | 10/2001 | Ben-Ami | 370/468 |
| 6,304,549 B1 | * | 10/2001 | Srinivasan et al. | 370/230 |
| 6,389,031 B1 | * | 5/2002 | Chao et al. | 370/412 |
| 6,400,681 B1 | * | 6/2002 | Bertin et al. | 370/218 |
| 6,400,687 B1 | * | 6/2002 | Davison et al. | 370/236 |

* cited by examiner

Primary Examiner—Chi Pham
Assistant Examiner—Prenell Jones
(74) Attorney, Agent, or Firm—Bracewell & Patterson LLP

(57) ABSTRACT

The present invention relates to a method and system of sharing among a plurality of virtual channel connections the bandwidth of a bandwidth adjustable virtual path connection established between a source node and a destination node within a packet or cell switching network comprising a plurality of nodes interconnected with transmission links, said virtual channel connections comprising bandwidth adjustable reserved virtual channel connections with minimum bandwidth reservation and/or reserved virtual channel connections and/or non reserved virtual channel connections with minimum bandwidth reservation or/and totally non reserved connections without minimum bandwidth reservation. When the source node receives a notification indicating a new bandwidth to allocate to the bandwidth adjustable virtual path connection, and when this new bandwidth is lower than the sum of the current reserved bandwidth of virtual channel connections, the current reserved bandwidth of each bandwidth adjustable virtual channel connection is reduced by applying a ratio to the part of the current bandwidth reserved above the minimum reservation. The ratio is, in a preferred embodiment, proportional to the difference between the sum of the reserved bandwidth of all virtual channel connections and the new available bandwidth allocated to the bandwidth adjustable virtual path connection, and inversely proportional to the sum of the bandwidth reserved above the minimum reservation for the bandwidth adjustable virtual channel connections.

10 Claims, 19 Drawing Sheets

VPC Table (VPCT)

| link | VPC | Used Bandwidth | | Reserved Bandwidth | | Total minimun Bandwidth | | Total used Bandwidth | Number non-reserved connections | Total allocated Bandwidth |
|---|---|---|---|---|---|---|---|---|---|---|
| | | ⓐ a+b | Ⓑ c | Ⓒ a+b | Ⓓ c | Ⓔ Reserved a+b+c | Ⓕ Non Reserved d | Ⓖ | Ⓘ | Ⓗ |
| link 1 | VPC 1 | 3 Mbps | 25 Mbps | 5 Mbps | 43 Mbps | 15 Mbps | 2 Mbps | 50 Mbps | 100 | 63 Mbps |
| | VPC2 | | | | | | | | | |
| | . | | | | | | | | | |
| | . | | | | | | | | | |
| | . | | | | | | | | | |
| | VPCi | | | | | | | | | |
| link 2 | VPC 1 | | | | | | | | | |
| link 3 | | | | | | | | | | |

METHOD AND SYSTEM IN A PACKET SWITCHING NETWORK FOR DYNAMICALLY SHARING THE BANDWIDTH OF A VIRTUAL PATH CONNECTION AMONG DIFFERENT TYPES OF CONNECTIONS

TECHNICAL FIELD OF THE INVENTION

The present invention relates to packet/cell switching networks or ATM network, and more particularly to a method and system for dynamically allocating bandwidth of a bandwidth adjustable Virtual Path Connection (ABR or CBR VPC) among a plurality of different Virtual Channel Connections (VCCs) requiring different categories of service.

BACKGROUND ART

High Speed Communication Networks

In nowadays telecommunication networks, different types of applications must share the same transmission media, and networks equipment must be able to support these different services while guaranteeing to each of them a specified quality of service. While some years ago, voice and data were using separate networks, they now share bandwidth of the same links. For the last three years, standard organisms have worked to define transmission modes, such as ATM (Asynchronous Transmission Mode), Frame Relay, . . . and inside a particular transmission mode, to specify in detail the services provided to network applications. For ATM, for instance, four different service categories exist, and a user will choose one of them based on the type of service required:

Continuous Bit Rate (CBR)

This service is intended for uncompressed voice, and highest priority applications (video). The price to pay for this service is the highest because the bandwidth which is reserved, corresponds to the maximum rate (Peak Cell Rate PCR) at which this type of applications can emit. This is the bandwidth to allocate when the quality of service, in terms of maximum Cell Transfer Delay (maxCTD) and Peak to peak Cell Delay Variation (peak to peak CDV), must be guaranteed whatever the network load conditions.

Variable Bit Rate (VBR)

This service is a compromise between the Continuous Bit Rate (CBR), which requires a lot of resources, and a service where no reservation of bandwidth would be done. Effectively here, a bandwidth comprised between the Sustainable Cell Rate (SCR) of the connection and the Peak Cell Rate (PCR) of said connection is allocated, depending on the burstiness of the traffic:

When the bursts created by the application in the network are limited, a bandwidth close to the Sustainable Cell Rate (SCR) is reserved.

When the bursts induced by the application are large (or may be large), a bandwidth closer to the Peak Cell Rate is reserved to avoid links and buffers overload, and data discard.

While the service offered here also guarantees a very low loss of packets or cells (Cell Loss Ratio CLR), the transfer delays and cell delay variations are more important than for CBR. VBR can be divided in VBR Real Time (good candidate for video and data RT applications) and VRB Non Real Time (good candidate for data sensitive traffic).

Unspecified Bit Rate (UBR)

This service is totally uncontrolled. Traffic is sent in the network, and is transmitted provided that the network is not congested. When the network is congested, cells are discarded. Unlike CBR and VBR, no quality of service can be guaranted.

Available Bit Rate (ABR)

This service provides again less quality than Variable Bit Rate (VBR), and can be used for different applications. While a minimum reservation can be done in the network to guarantee to an application a "worst case" behaviour, the steady state behaviour of the service offered corresponds to a "non reserved" type of service, where nearly no resource is allocated in the network. When congestion occurs, feedbacks are conveyed through the network back to the traffic sources to prevent them from sending more data. This reactive system behaviour is directly linked to the network size. The delay to convey back congestion information to the sources increases in function of the network size, and may induce losses anyway. In this case, end users take decisions to send again the data. Here nor the delays neither the losses can be guaranteed; the service is only assumed to minimise the losses.

All these different services are proposed and used simultaneously in most networks.

Bandwidth Optimisation

Most of the wide ATM networks (large country, worldwide networks) are configured so that an ATM backbone network can support the communications between different ATM access networks. Such network topology allows good performances and the optimisation of the network administration. Generally, the backbone network is a public ATM network, and access networks are private ATM networks. However, the backbone can be used within a single private network using for example lines leased from a carrier. To optimise the resources where they are the more demanded, in particular the bandwidth within the backbone network, several solutions can be implemented, all taking into account the dynamic availability of the bandwidth:

1. End to End Available Bit Rate Virtual Channel Connections (ABR VCCs) for Data Traffic.

This solution, as illustrated in FIG. 5, supposes the support the ABR service by all end-systems (nodes 1 and 8). The advantage is that intermediate nodes (nodes 2 to 7) have only to set an Explicit Forward Congestion Indication (EFCI) bit in the ATM cells to be compliant with the ATM Forum recommendation (ATM Forum—Technical Committee—"Traffic Management Specification", version 4.0, April 1996, paragraph 5.10.6, rule 1.a)). End-systems (nodes 1 and 8) do the most complex process in particular:

the ABR source behaviour (node 1) including:
  generation of Resource Management cells (RM-cells),
  insertion of RM-cells in the traffic,
  computation of a transmission rate per VCC based on congestion information received from RM-cells,
  dynamic traffic shaping, . . .
and, the ABR destination (node 8) behaviour including:
  transmission of RM-cells back to the source in response to forward RM-cells,
  setting of the congestion fields within RM-cells,
  insertion of RM-cells in the traffic, . . .

A more sophisticated implementation of the Available Bit Rate (ABR) category of service in intermediate nodes is described in the ATM Forum paragraph 5.10.6, rule 1.c). The so called "switch behaviour" allows the control of congestion at queuing points and in particular the modification of the Explicit Rate (ER) field within RM-cells for a better response to congestion and thus a lower cell loss.

2. Available Bit Rate Virtual Path Connections (ABR VPCs) in the Backbone.

ABR Virtual Path Connections (VPCs), as illustrated in FIG. 6, are set up in the backbone network for interconnecting access networks (access networks 1 and 2). The nodes within the access networks directly connected to the backbone network (nodes 2 and 5) use these ABR VPCs to transport VCCs (VCC1, VCC3). In order to comply with the ATM Forum recommendations (paragraph 5.10.9), these nodes implement the ABR source and destination behaviour as described in paragraphs 5.10.4 to 5.10.9. Access nodes (nodes 2 and 5) must also be able to provide a fair share of the bandwidth of these Virtual Path Connections (VPCs) among the different Virtual Channel Connections (VCC1, VCC3) they support.

3. Continuous Bit Rate Virtual Path Connections (CBR VPCs) With Adjustable Bandwidth in the Backbone.

A bandwidth adjustable CBR Virtual Path Connection (VPC), as illustrated in FIG. 7, is set up in the backbone network for interconnecting the access networks (access networks 1 and 2). The nodes within the access networks directly connected to the backbone network (nodes 2 and 5) use this CBR VPC to transport VCCs. Access nodes must provide a fair share of the bandwidth of this CBR Virtual Path Connection (VPC) among the different Virtual Channel Connections (VCC1, VCC3) it supports.

4. ABR Virtual Path Between Access Network and Backbone Network for Interfacing a Bandwidth Adjustable CBR in the Backbone Network.

A bandwidth adjustable CBR Virtual Path Connection (VPC), as illustrated in FIG. 8, is set up in the backbone and interfaces with the source access network by means of a standard (conform to ATM specifications) ABR Virtual Path Connection (ABR VPC). The nodes within the access network directly connected to the backbone network (nodes 2 or 5) use this ABR VPC to transport VCCs. Access nodes must provide a fair share of the bandwidth of this ABR Virtual Path Connections (VPCs) among the different Virtual Channel Connections (VCC1, VCC3) they support.

These last two solutions imply a dynamic adjustment of the CBR VPC bandwidth according to the network availability. Each time the bandwidth of a CBR connection has to be modified, the Connection Admission Control (CAC) process is triggered. However, because this process requires a large amount of resources, it cannot be processed continuously. A certain degree of integration is necessary to manage the fluctuations of the network load. The response time required to adjust the bandwidth of a CBR VPC is not in the order of the millisecond, as for an ABR VPC, but in the order of the minute or more depending the number of voice connections established and disconnected within a given time period.

Bandwidth Adjustable Virtual Path Connections

The establishment of dynamic bandwidth adjustable Virtual Paths Connections (ABR or CBR VPCs) as shown in solutions 2 to 4 allows the aggregation of multiple VCCs and thus a better management of the bandwidth within the backbone network:

VCC Aggregation:

While, most Virtual Channel Connections (VCCs) within access networks don't require a large amount of bandwidth, the traffic between the different access networks through the backbone network requires as for it, the definition of a large bandwidth connections. The use of Virtual Path Connections (VPCs) considerably limit the number of VCCs which must be established on the backbone network, while optimizing the bandwidth utilization. The response time is generally reduced, avoiding delays in the different policing processes. While in access networks CBR, VBR or ABR/UBR Virtual Channel Connections (VCCs) are established, the backbone network requires usually ABR or CBR VPCs. These Virtual Path Connections must be able to transport any category of service without distinction of quality, through the backbone network.

Bandwidth Management:

The quality of the process used at the backbone/access networks edges to allocate the bandwidth of a VPC among different individual VCC connections determines the overall performance of the end to end service: short delays for high priority traffic (voice or CBR traffic), and smoothing of low priority traffic (data or ABR traffic) even if, within the backbone network, in a same Virtual Path Connection (VPC), all types of traffic are mixed. The different functions of the process for controlling the traffic are:

Smoothing: a shaping function is used to send the traffic of the Virtual Channel Connections (VCCs) on the Virtual Path Connection (VPC), controlling the maximum transmission rate. Delays between consecutive cells are introduced to space the flow.

Queuing: the shaping function lets the traffic leave the node at a lower rate than available. This induces additional queuing in the node. A good implementation allows the storing of data without loss.

Bandwidth Allocation: within a given Virtual Path Connection (VPC), the bandwidth is allocated among the different VCC connections. Rules must be chosen to fairly allocate the bandwidth of a Virtual Path Connection (VPC) taking into account the category of service of the different VCCs (CBR, VBR, ABR, UBR . . . ).

ABR and Bandwidth Adjustable CBR Virtual Path Connections (VPC)

ABR Virtual Path Connections (FIG. 6)

While the Available Bit Rate (ABR) service category is defined in the ATM Forum specifications and provides an efficient bandwidth utilization, its implementation requires important resources in term of:

processing capacity for managing RM-cells along the ABR VPC and continuously (in a time period in the order of the micro or milli second) adjusting the bandwidth.

additional bandwidth. Per default, 1 RM-cell is generated every 32 cells, which represents about 3% additional bandwidth only used for the RM-cell traffic.

Solutions based on equivalent principles (dynamic bandwidth adjustment function of the network availability), but characterized by a slower reaction time (Minutes or seconds instead of microseconds) are then preferred to ABR service category to save resources Bandwidth Adjustable CBR Virtual Path Connection (FIGS. 7 and 8)

The ATM specifications defined in the ATM Forum don't define any bandwidth adjustable CBR VPC. This service category is not standard and its implementation depends on the backbone network provider. As illustrated in FIGS. 7 and 8, two configurations comprising a bandwidth adjustable CBR VPC in the ATM backbone network can be considered:

If both access network and backbone network are managed by the same network provider, it is possible to define a specific (proprietary) solution for transporting the adjustment information including the VPC transmission rate from the backbone network to the access network. In this case, proprietary RM-cells (with the format defined in the ATM specifications or not) can be used at the interface between access network and backbone network (between node 2 and node 3).

Notes: this is said "proprietary" because ATM specifications do not mention RM cells over a CBR PVC.

A more flexible configuration can be considered if access and backbone networks are not managed by the same provider. In this case, only a standard interface can be used. A solution is to configure an Available Bit Rate (ABR) Virtual Path Connection (VPC) between node 2 and 3 in order to provide this standard interface to the proprietary CBR VPC established in the backbone network. Node 2 will see an ABR VPC and reacts as if an end to end ABR VPC was set-up. In the backbone network, node 3 at the destination of the ABR VPC and at the source of the adjustable CBR VPC, will be in charge of translating the CBR VPC bandwidth adjustments into RM-cells updates on the ABR VPC.

SUMMARY OF THE INVENTION

The object of the present invention is to fairly allocate the bandwidth of a bandwidth adjustable virtual path connection established within a backbone network among the different virtual channel connections it transport, taking into account the category of service (CBR, VBR, ABR, UBR . . . ) of the respective virtual channel connections.

More particularly, the present invention relates to a method and system of sharing among a plurality of virtual channel connections the bandwidth of a bandwidth adjustable virtual path connection established between a source node and a destination node within a packet or cell switching network comprising a plurality of nodes interconnected with transmission links, these virtual channel connections comprising bandwidth adjustable reserved virtual channel connections with minimum bandwidth reservation and/or reserved virtual channel connections and/or non reserved virtual channel connections with minimum bandwidth reservation or/and totally non reserved connections without minimum bandwidth reservation.

When the source node receives from the network a notification indicating a new bandwidth to allocate to the bandwidth adjustable virtual path connection, and when this new bandwidth is lower than the sum of the current reserved bandwidth of virtual channel connections, the current reserved bandwidth of each bandwidth adjustable virtual channel connection is reduced by applying a ratio to the part of the current bandwidth reserved above the minimum reservation. The ratio is, in a preferred embodiment, proportional to the difference between the sum of the reserved bandwidth of all virtual channel connections and the new available bandwidth allocated to the bandwidth adjustable virtual path connection, and inversely proportional to the sum of the bandwidth reserved above the minimum reservation for the bandwidth adjustable virtual channel connections.

DRAWINGS

The novel and inventive features believed characteristics of the invention are set forth in the appended claims. The invention itself, however, as well as a preferred mode of use, further objects and advantages thereof, will best be understood by reference to the following detailed description of an illustrative detailed embodiment when read in conjunction with the accompanying drawings, wherein:

Figure 3:
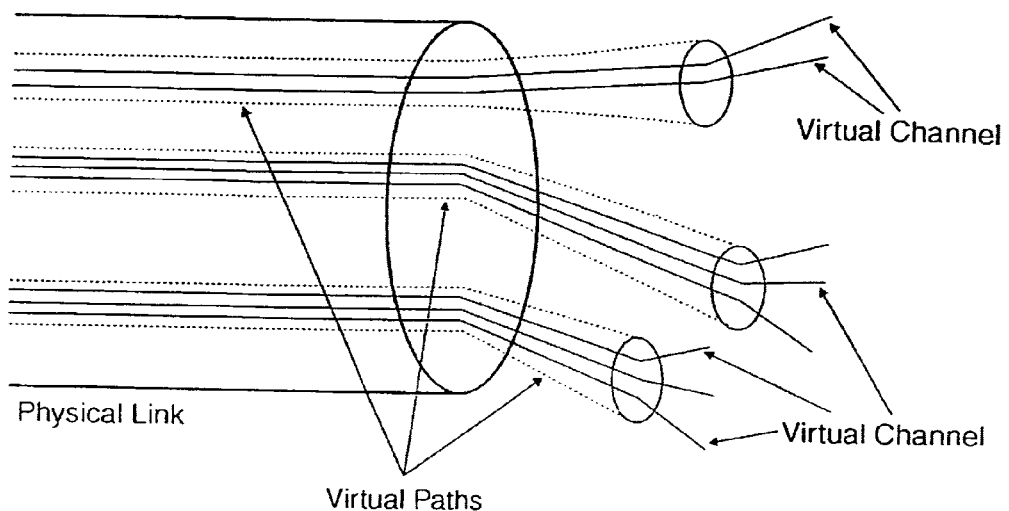

FIG. 3 summarizes the relationship between links, VPs and VCs in an ATM network.

Figure 4:
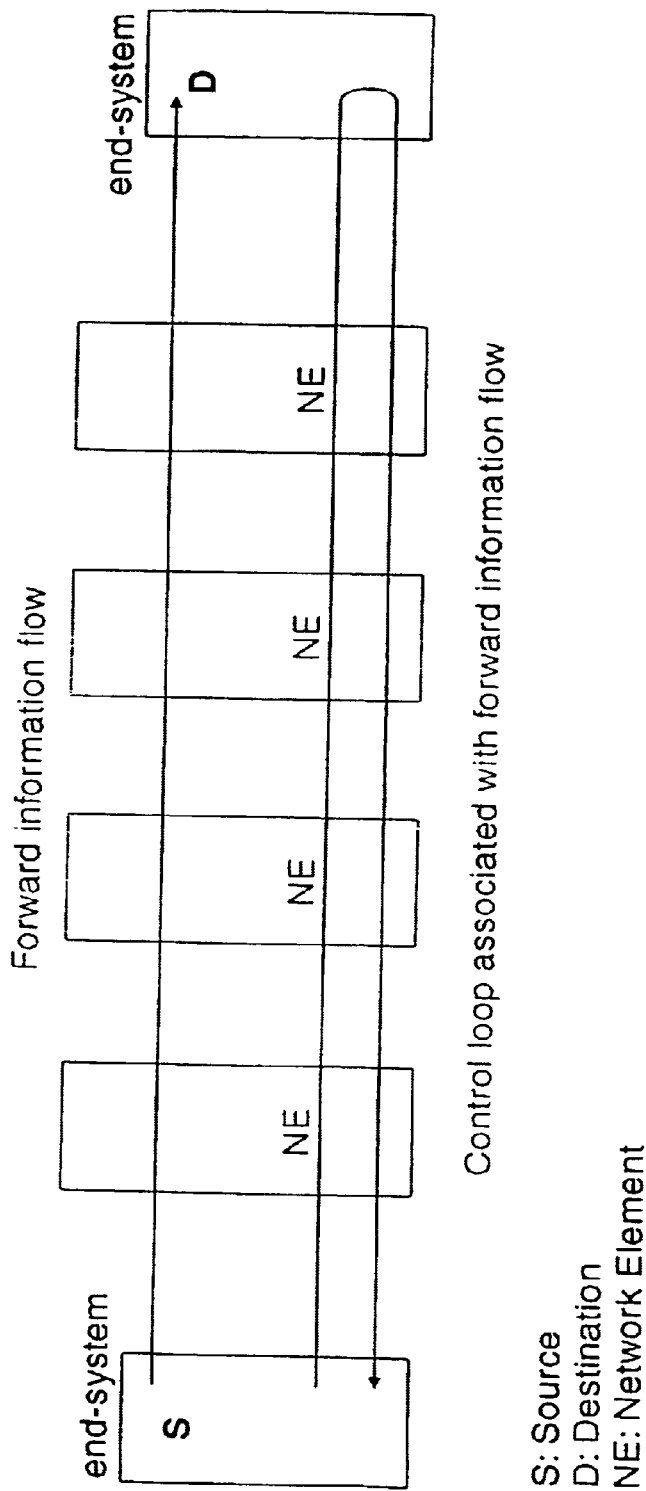

FIG. 4 is an example of a source to destination ABR control loop according to the ATM Forum.

Figure 5:
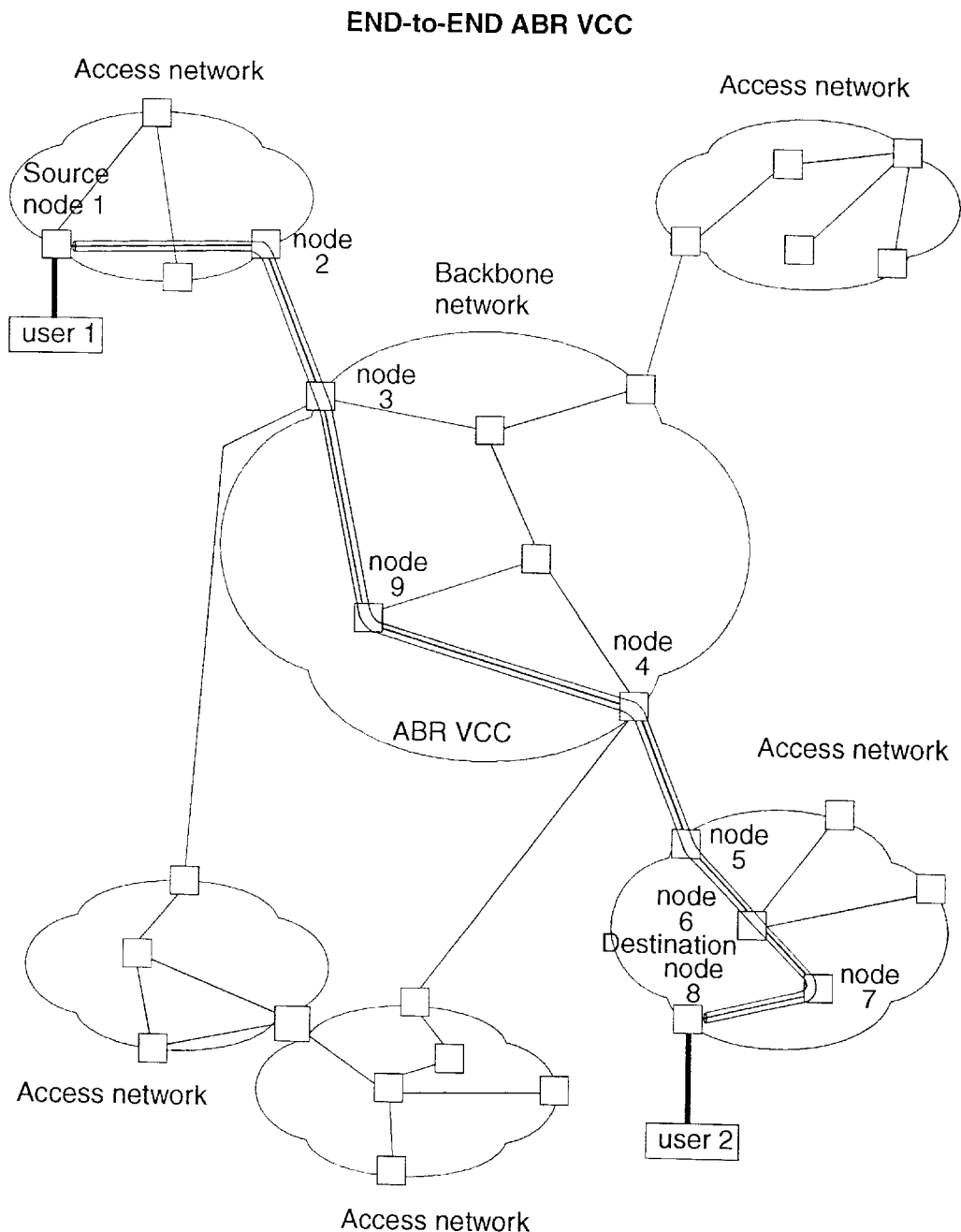

FIG. 5 illustrates the establishment of an end to end Available Bit Rate Virtual Channel Connection (ABR VCC) between a source end system and a destination end-system.

Figure 6:
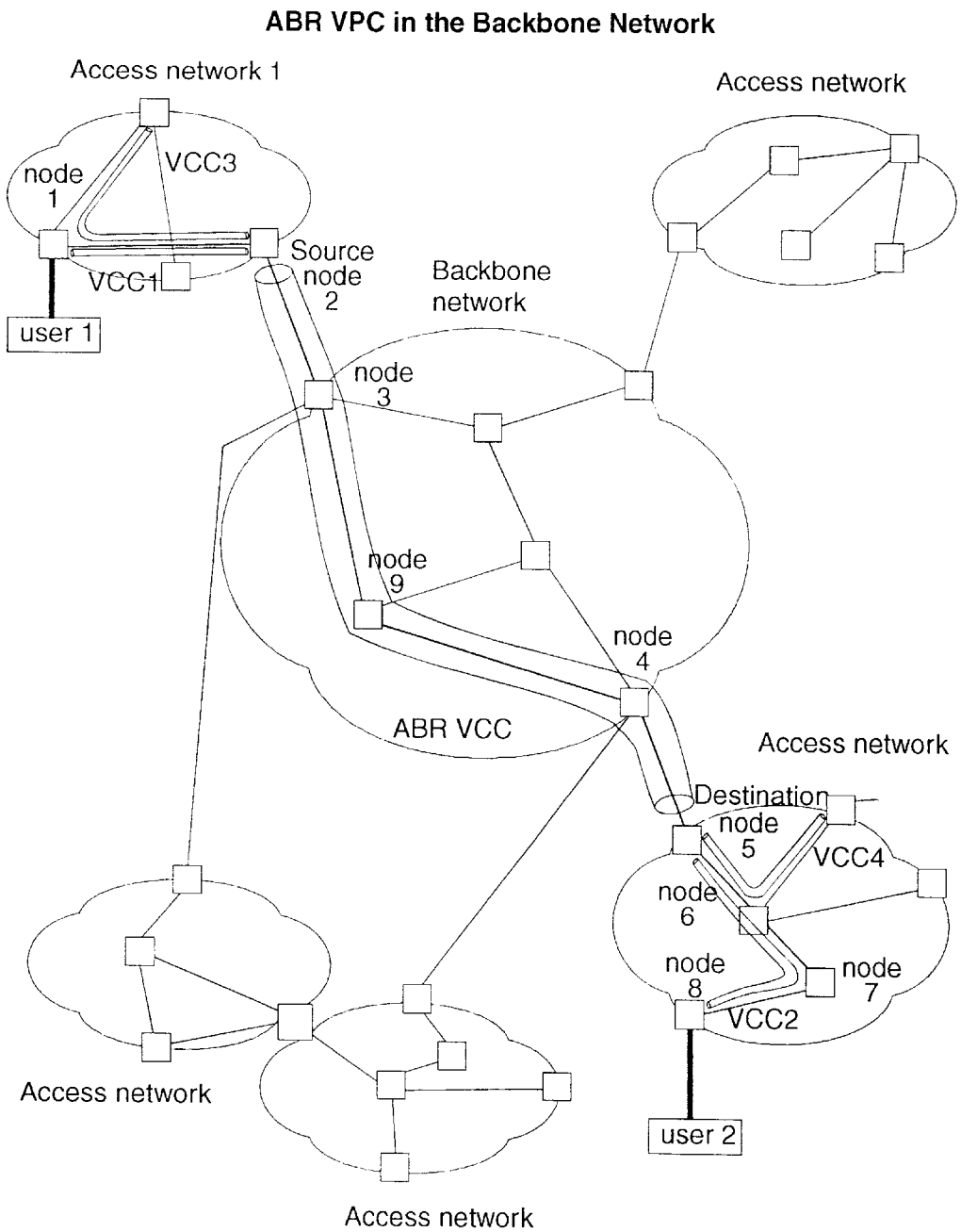

FIG. 6 illustrates the establishment of an Available Bit Rate Virtual Path Connection (ABR VPC) on the backbone network.

Figure 7:
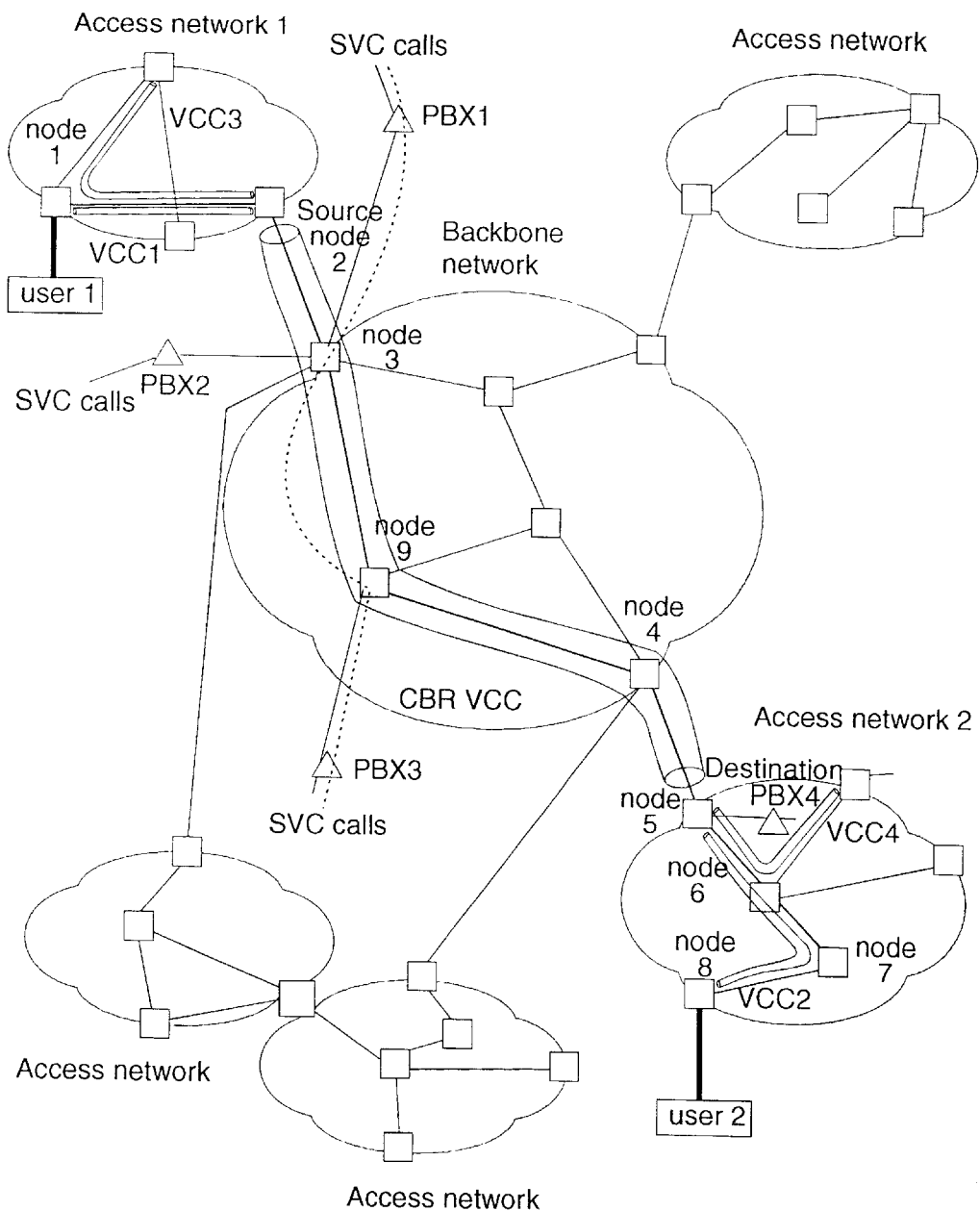

FIG. 7 illustrates the establishment of a Continuous Bit Rate Virtual Path Connection (CBR VPC) with dynamic bandwidth allocation on the backbone network.

Figure 8:
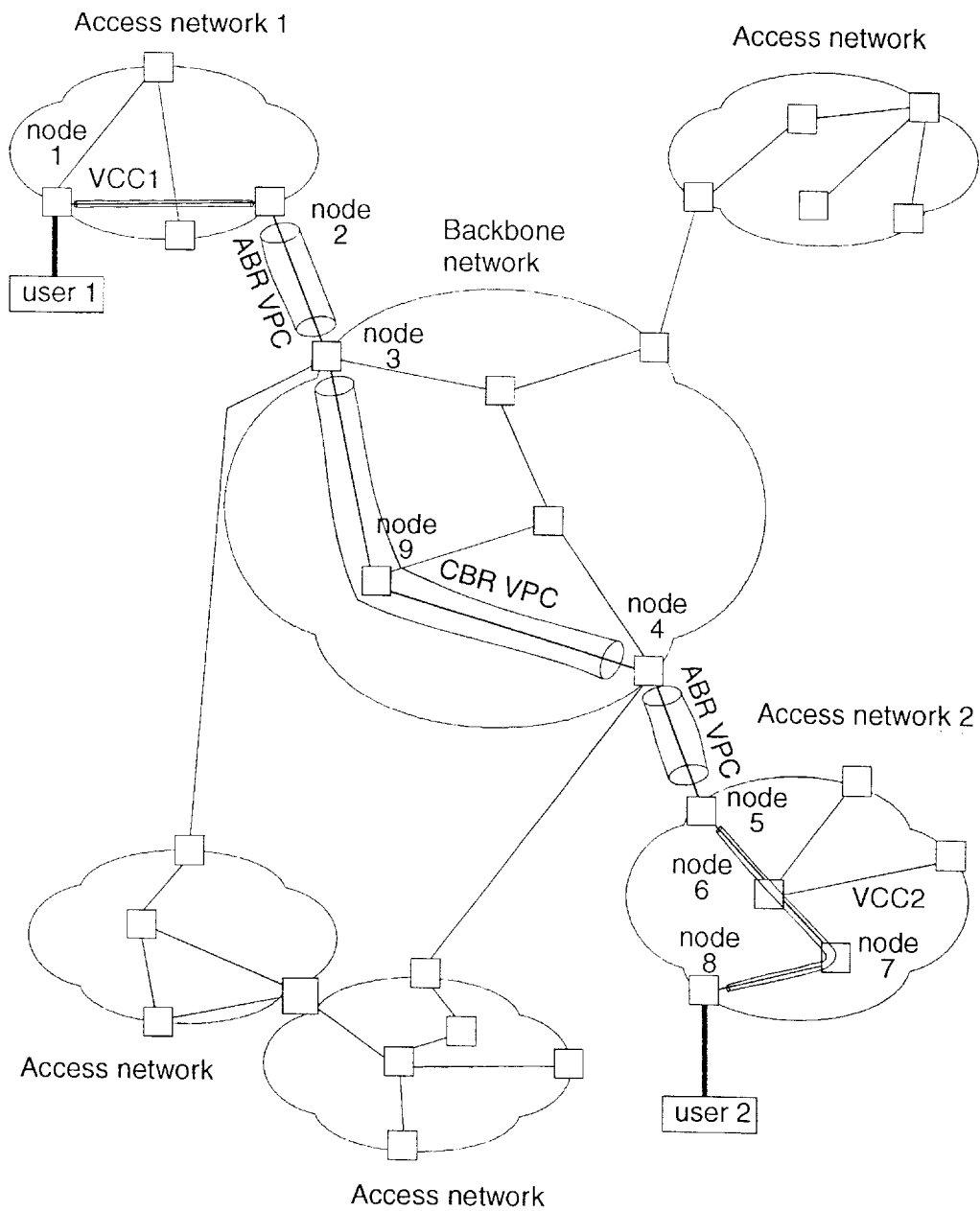

FIG. 8 illustrates the establishment of an ABR Virtual Path between access network and backbone network for interfacing a bandwidth adjustable CBR in the backbone network.

Figure 9:
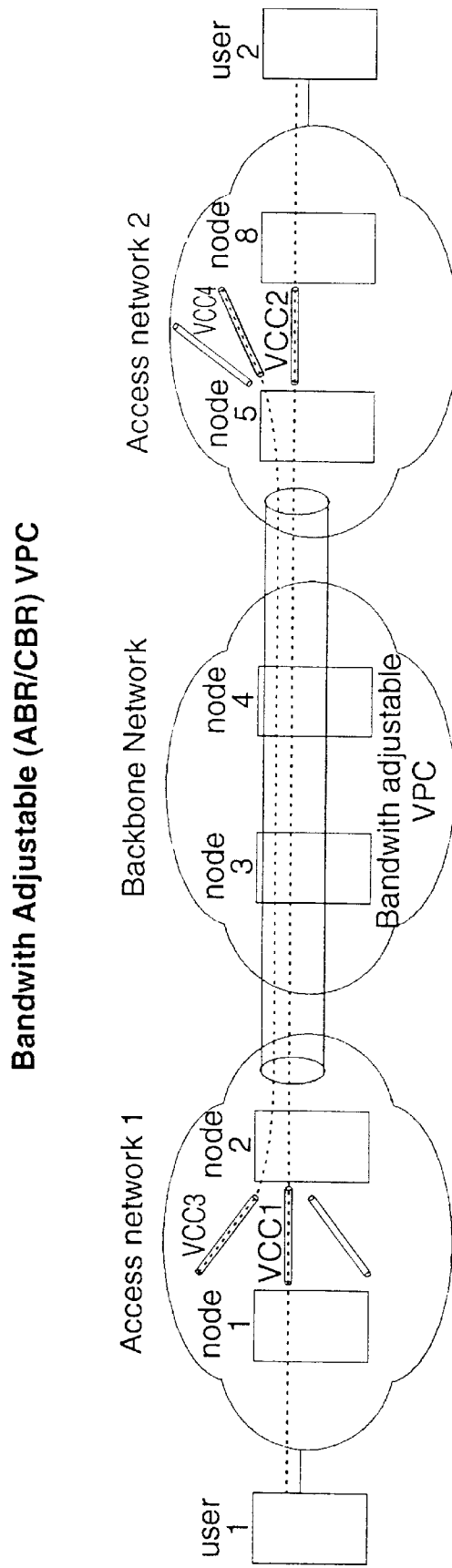

FIG. 9 shows the establishment of Virtual Path and Virtual Channel Connections through respectively the backbone and access networks.

Figure 10:
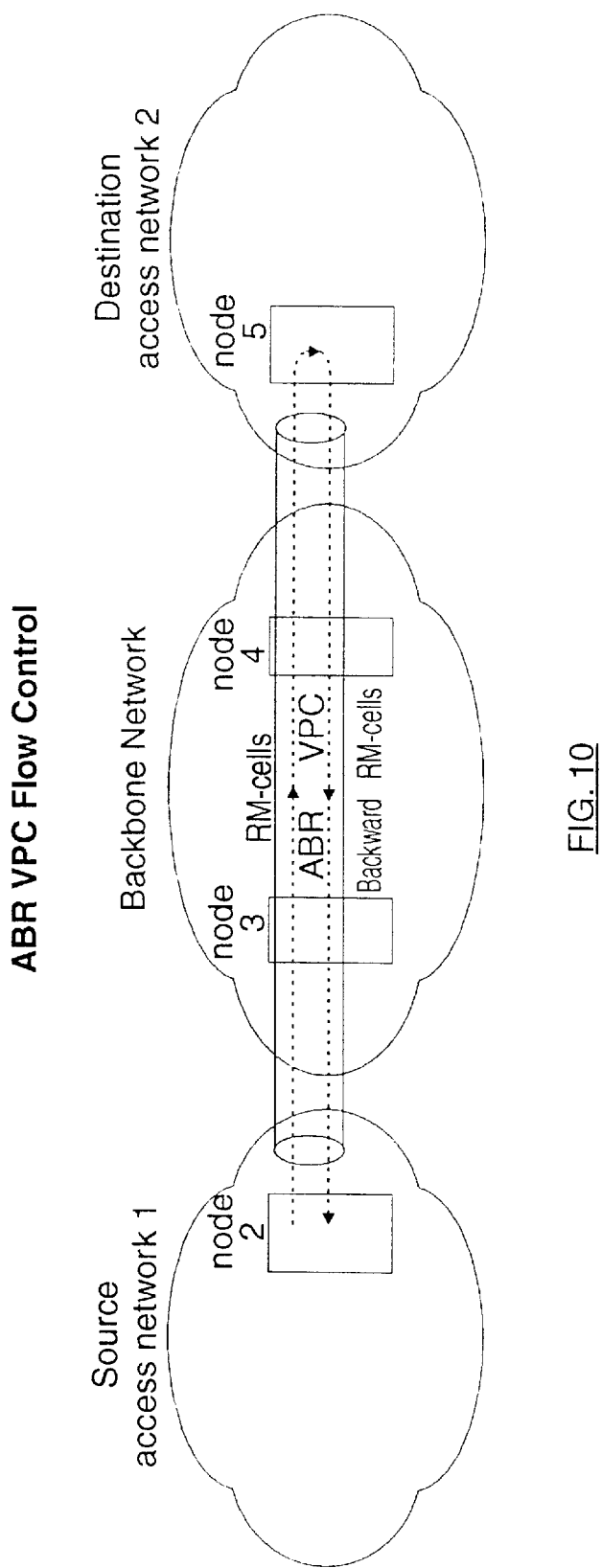

FIG. 10 shows how the access networks and the backbone network interface together to manage an ABR Virtual Path (VP) established on the backbone network.

Figure 11:
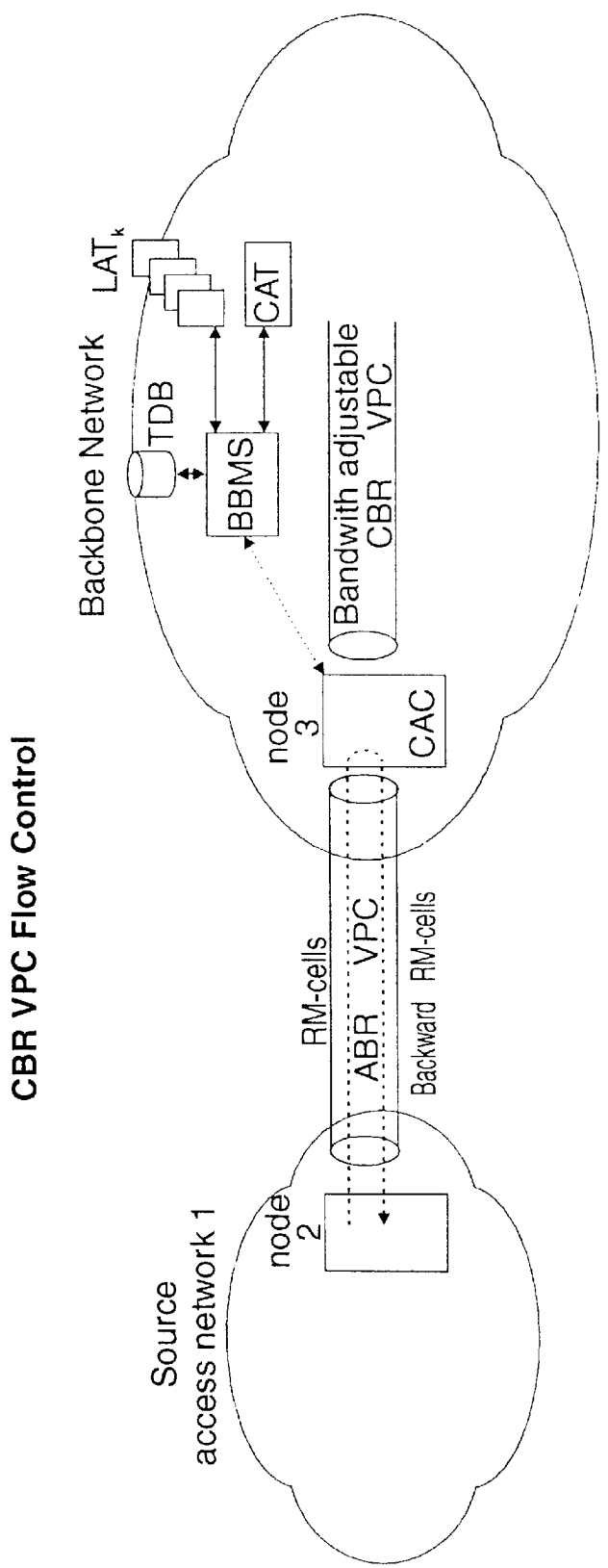

FIG. 11 shows how the access networks and the backbone network interface together for managing a CBR Virtual Path (VP) set-up on the backbone network.

Figure 12:
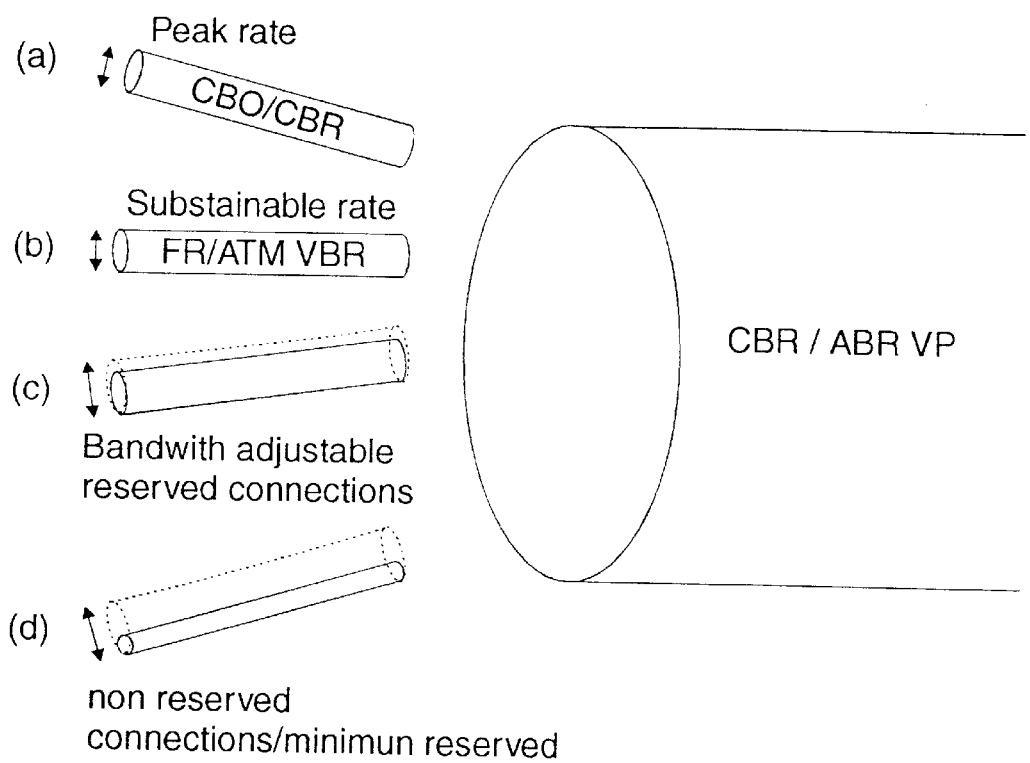

FIG. 12 shows the different types of Virtual Channel Connections (VCCs) that can be supported according to the present invention by an ABR or CBR Virtual Path established on the ATM backbone network.

Figure 13:
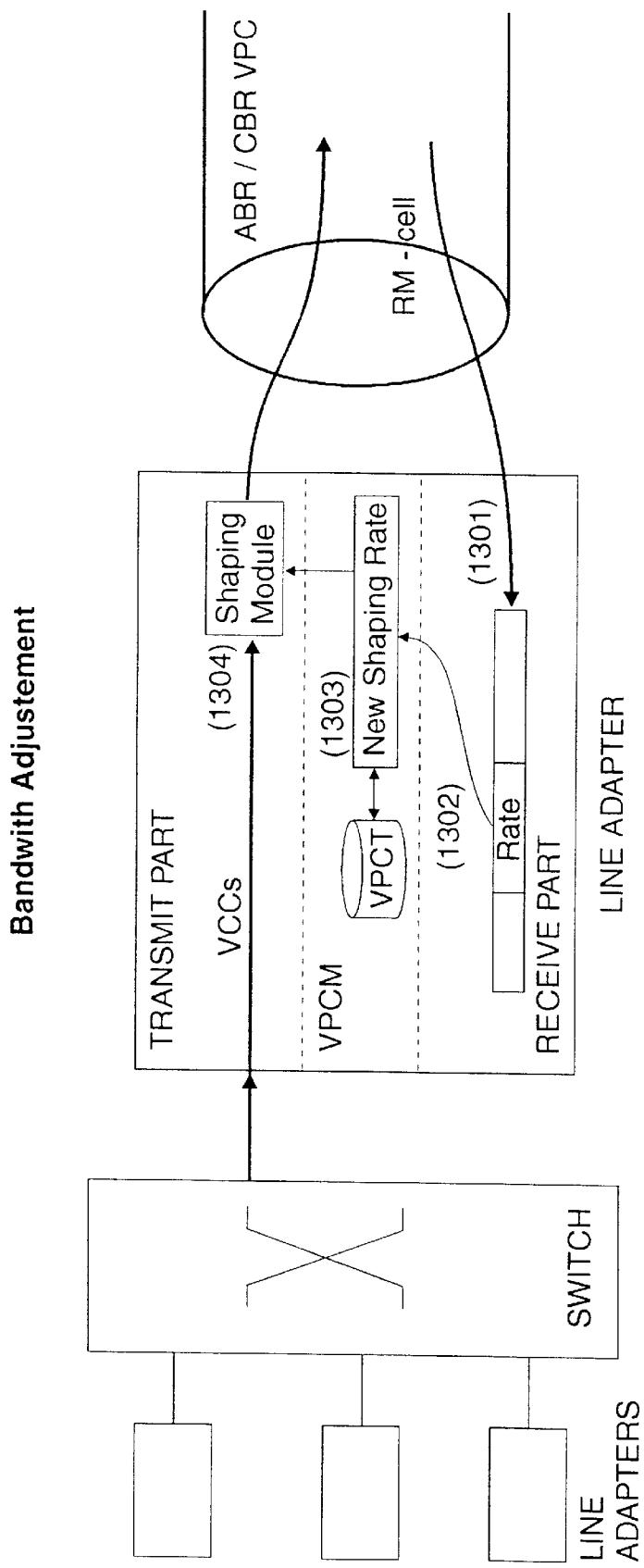

FIG. 13 describes the bandwidth adjustment mechanism and in particular the relationship within a given adapter between the receive part which receives the backward RM-cells, the Virtual Path Connection Manager which computes the VPC transmission rate and the transmit part which sends the shaped traffic on the ABR or CBR Virtual Path Connection (VPC).

FIG. 14 is a general view of the Virtual Path Connection Table (VPCT).

Figure 15:
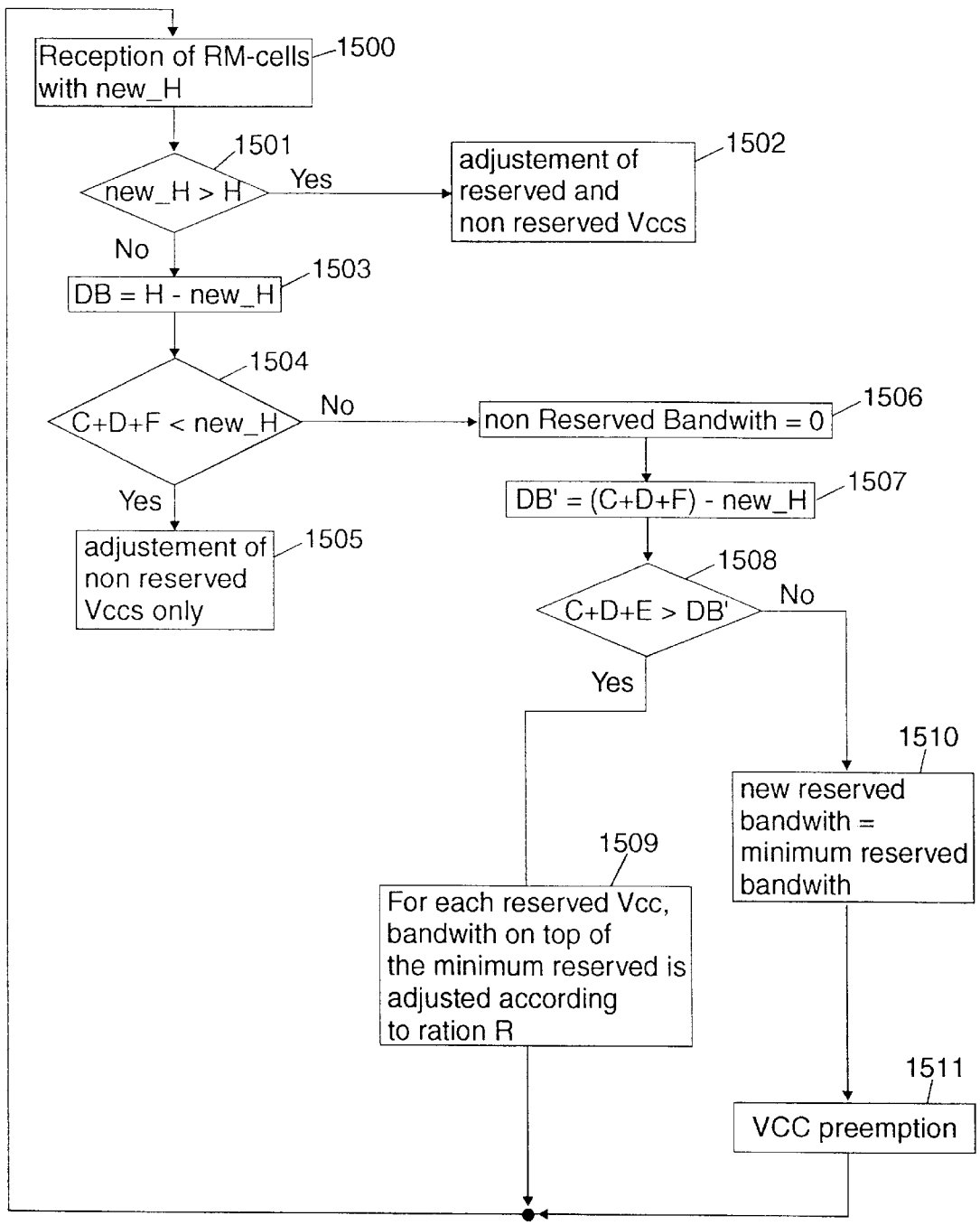

FIG. 15 is a flow chart of the bandwidth sharing process.

Figure 16:
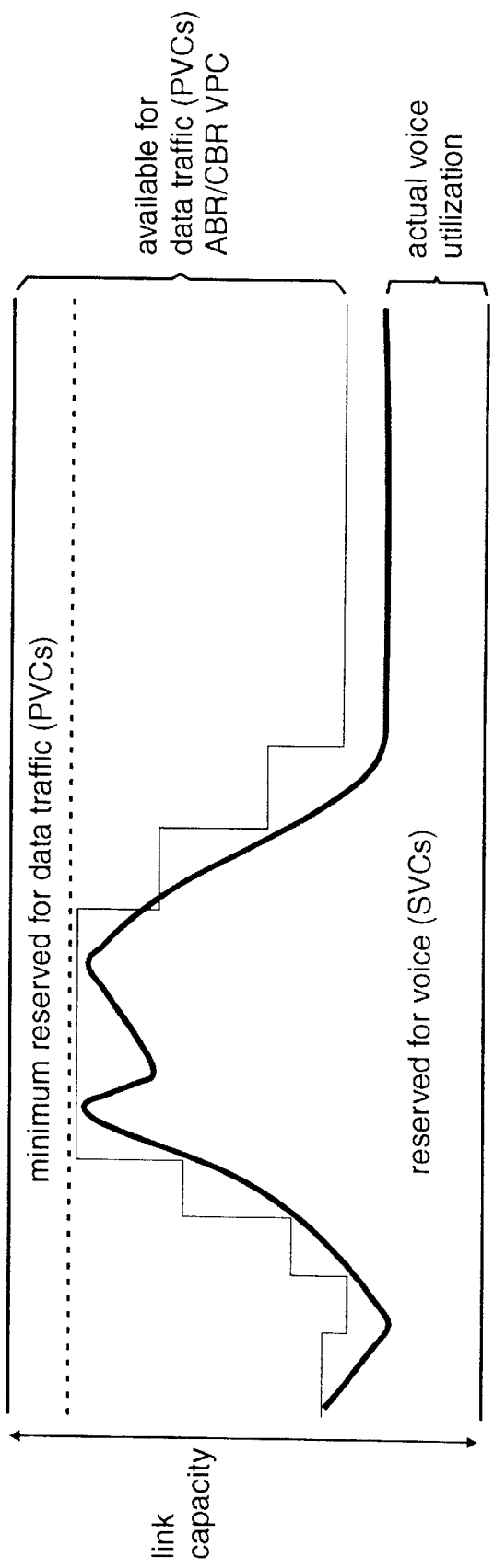

FIG. 16 shows the bandwidth adjustment of an ABR or CBR Virtual Path Connection (VC) established in a backbone link in accordance with the variation of the voice traffic.

Figure 17:
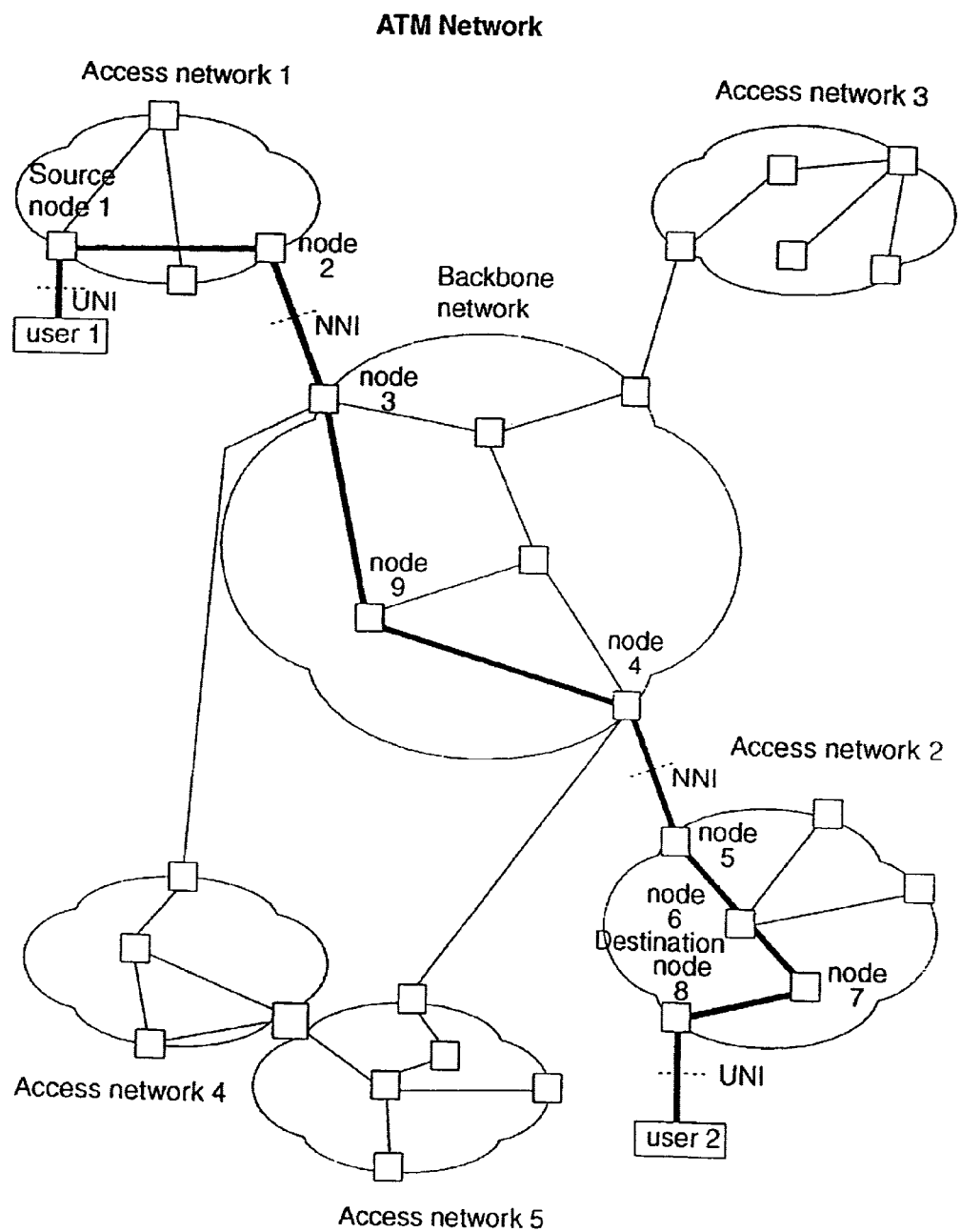

FIG. 17 is a general view of an ATM network comprising a backbone network with a plurality of access networks.

Figure 18:
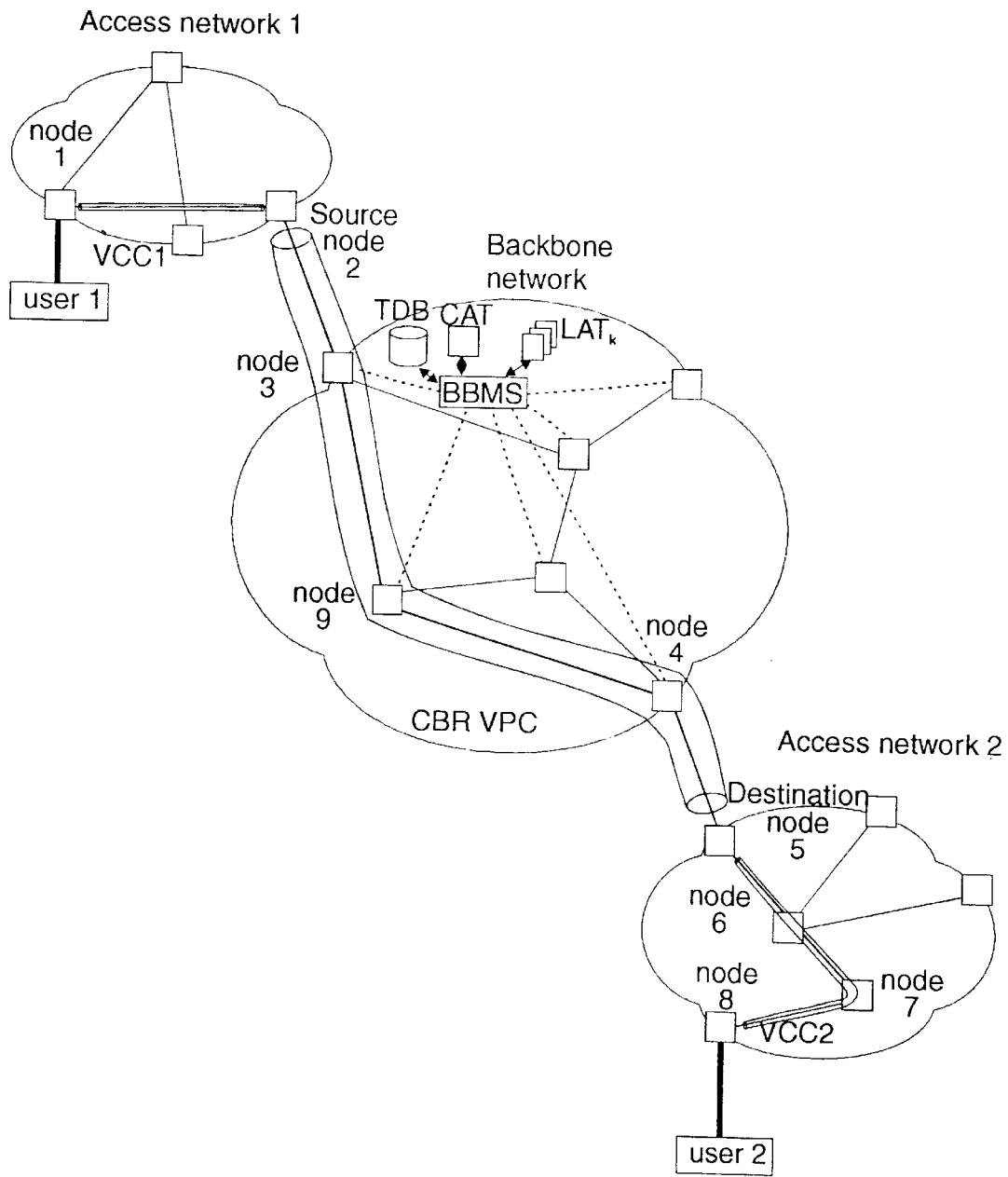

FIG. 18 shows a Continuous Bit Rate (CBR) Virtual Path Connection (VPC) in a backbone network controlled by a Bandwidth Management Server.

Figure 19:
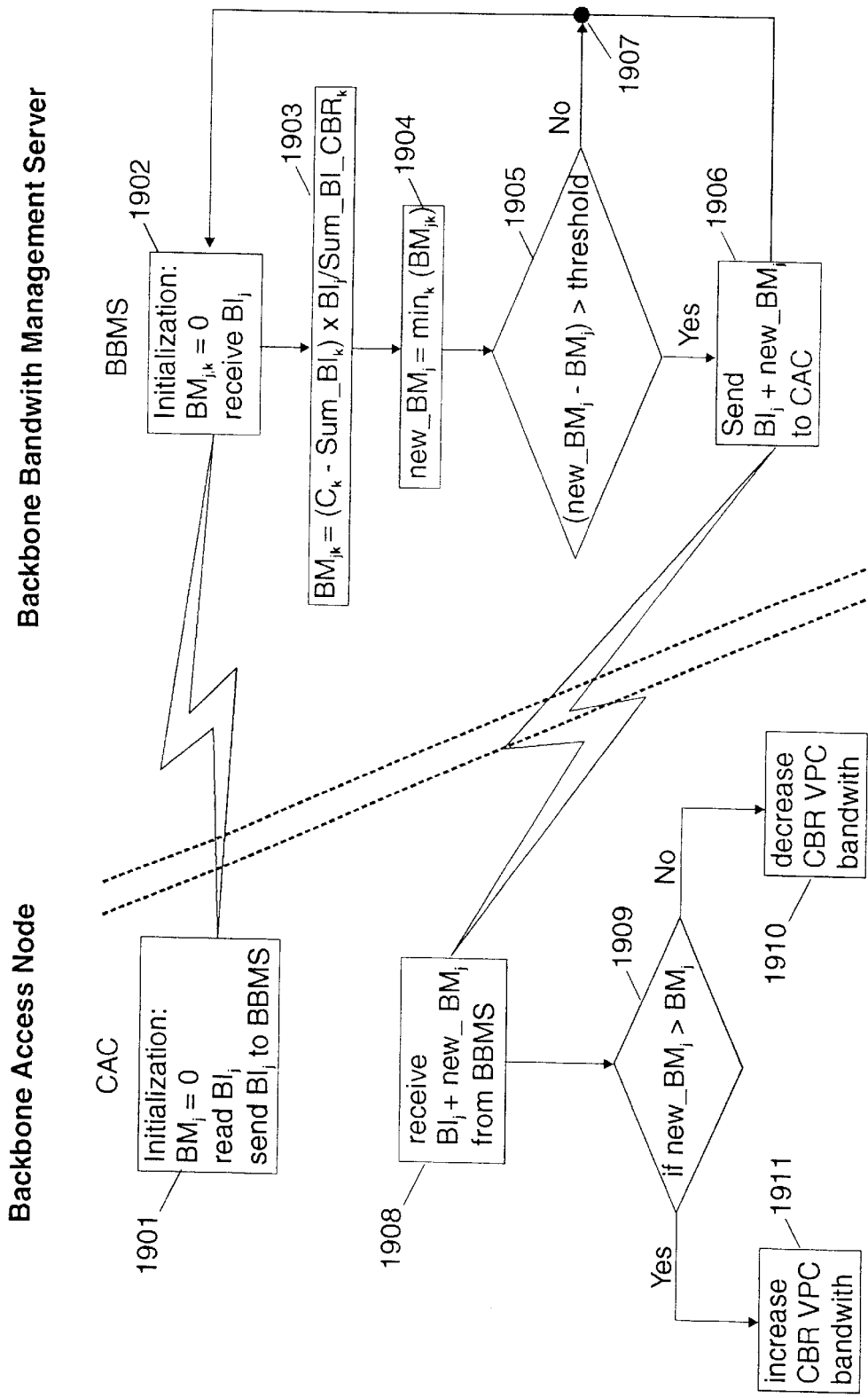

FIG. 19 is a flow chart of the method for dynamically adjusting the bandwidth of a Continuous Bit Rate (CBR) Virtual Path Connection (VPC).

PREFERRED EMBODIMENT OF THE INVENTION

Asynchronous Transfer Mode (ATM)

The Asynchronous Transfer Mode (ATM) is a new telecommunication technology to developed by the telecommunications (carrier) industry for both the data transmissions (computer) and the telecommunications (telephone). This is conceived as a carrier service to provide high speed communications to end users in an integrated way. The principle key concepts of ATM are as follows:

Cells: all information (voice, image, video, data . . . ) is transported through the network in very short, fixed length (48 data bytes plus a 5-byte header) blocks called "cells". The ATM cell size was defined as a compromise between voice and data requirements.

Routing: information flow along paths (called "Virtual Channels" VC) is set up as a series of pointers through the network. The cell header contains an identifier that links the cell to the correct path for it to take towards its destination. Cells on a particular virtual channel always follow the same path through the network and are delivered to the destination in the same order in which they are received.

Hardware-Based Switching: ATM is designed so that simple hardware based logic elements may be employed at each node to perform the switching.

Adaptation: at the edges of the network user data frames are broken up into cells. Continuous data streams such as voice and video are assembled into cells. At the destination side of the network the user data frames are reconstructed from the received cells and returned to the end user in the form (data frames etc.) that they were delivered to the network. This adaptation function is considered part of the network but is in a higher layer function, which is called ATM Adaptation Layer (AAL).

Error Control: the ATM cell switching network only checks cell headers for errors and simply discards cells in error.

Flow Control: an ATM network has no internal flow control of any kind. Instead ATM has a set of input rate controls that limit the rate of traffic delivered to the network.

Congestion Control: there is only one thing an ATM network can do when a link or node becomes congested, cells are discarded until the problem has been relieved. Some (lower-priority) cells can be marked such that they are the first to be discarded in the case of congestion. Connection endpoints are not notified when cells are discarded. It is up to the adaptation function or higher-layer protocols to detect and recover from the loss of cells (if necessary and possible).

Additional information concerning ATM networks can be found in publication entitled "Asynchronous Transfer Mode Broad band ISDN) Technical Overview", IBM International Technical Support Centers, October 1995, SG24-4625-00.

Structure of ATM Networks

Figure 1:
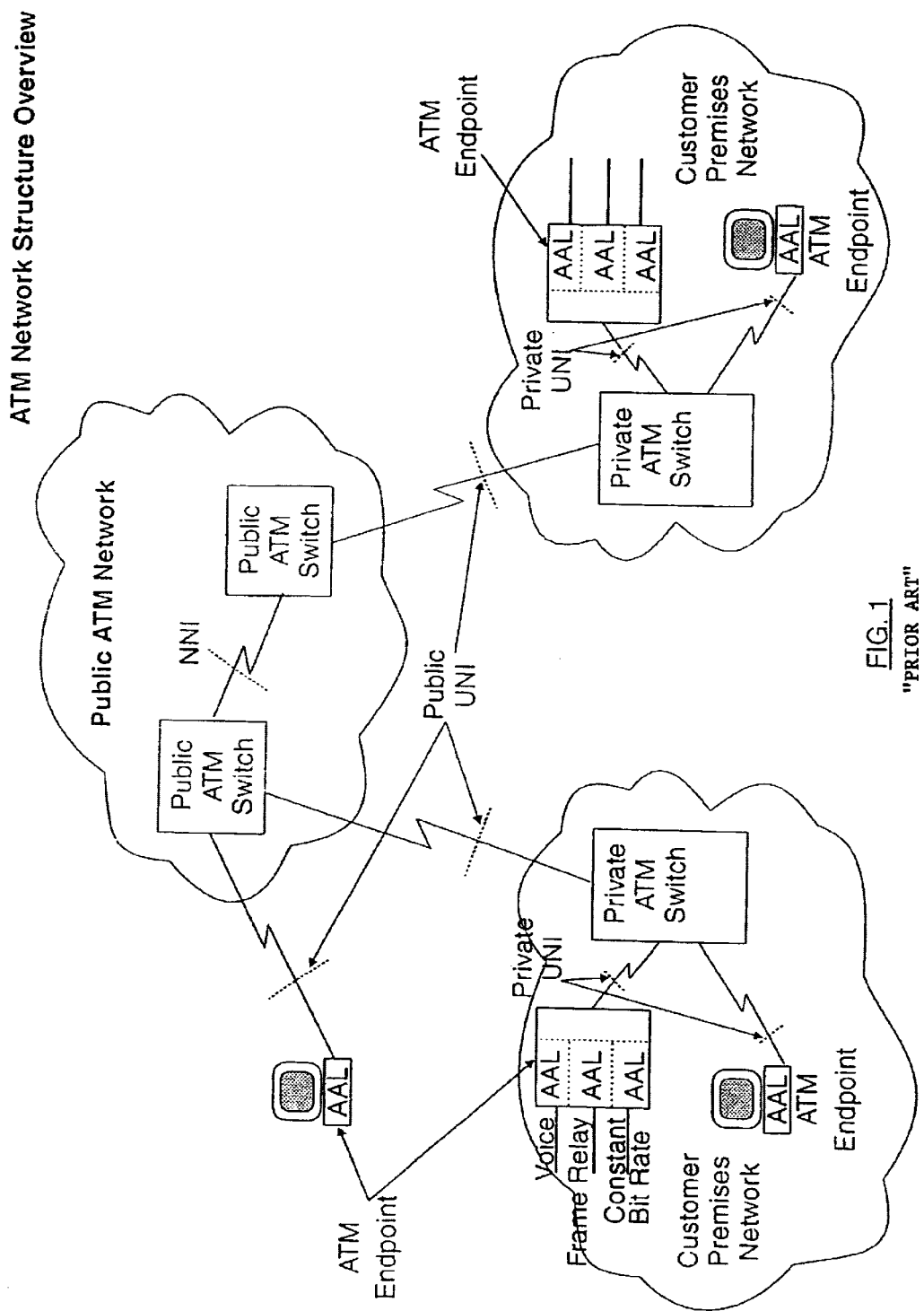
FIG. 1 is an overview of and ATM network.

The conceptual structure of an ATM network is shown in FIG. 1:

ATM Networks: FIG. 1 shows three quite separate ATM networks—two private and one public. Private ATM networks are sometimes called "Customer Premises Networks".

ATM Switches: Four "ATM Switches" or "ATM nodes" are shown in FIG. 1. These perform the backbone data transport with the ATM network.

ATM End point: The ATM end point is a piece of end user equipment that interfaces to an ATM network in a native way. An end point sends and receives ATM cells on link connections defined by ATM standards. An end point (and only an end point) contains an ATM Adaptation Layer (AAL) function. An ATM end point connects to the ATM network over the User Network Interface (UNI)

User Network Interface (UNI): The UNI is specified exactly by the applicable standards. The public UNI is for connection of end-user equipment to a public ATM network. The private UNI is for use within a single organisation's premises or for a private network using lines leased from a carrier such as the PTT.

Network Node Interface (NNI) This is the trunk connection between two Network Nodes (NNs). NNI allows the connection of different ATM nodes.

Links: They may be one or many physical link connections between the nodes. Links between nodes may be carried as "clear channel" such as over a direct point-to-point connection but may also be carried over an Sonet/SDH connection or over a PDH connection.

ATM Adaptation Layers: End users of an ATM network will be of two kinds:
 Those that interface to the ATM network directly through either the public UNI or a private UNI.
 Those that do not know anything about ATM and interface using a non-ATM protocol (such as Frame Relay).

For all types of users there are common tasks that must be performed in order to connect to the ATM network. In its definition ATM includes processing for these common tasks. This is called the ATM Adaptation Layer (AAL). The AAL is the real end-user interface to ATM.

Virtual Channels and Virtual Routes

Figure 2:
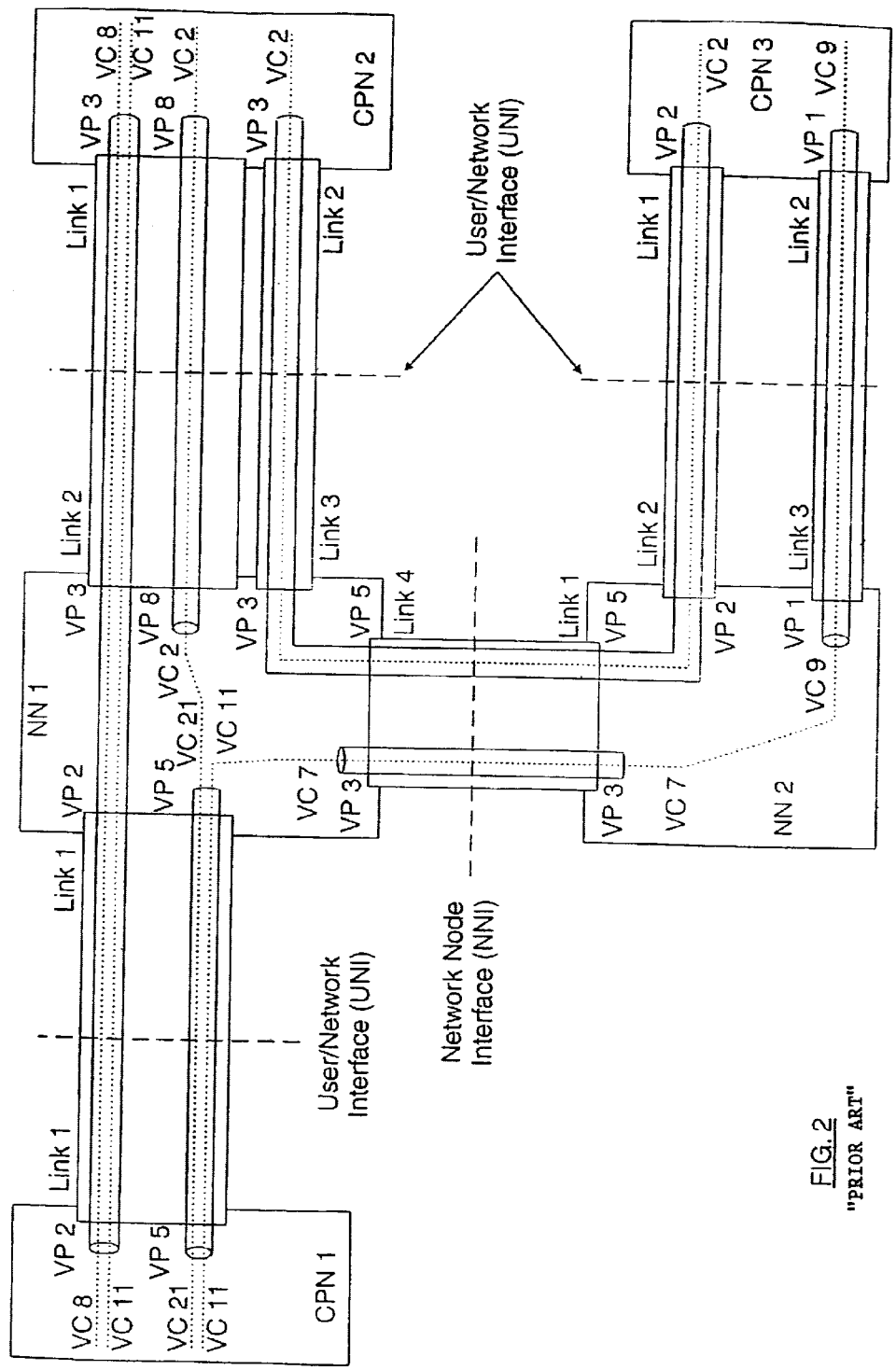
FIG. 2 illustrates the routing concept in an ATM network.

One of the key concepts in ATM are those relating to how data is routed through the network. FIG. 2 illustrates these concepts:

Virtual Path (VP):
As illustrated in FIG. 2, a VP is a route through the network representing a group of virtual channels (Vcs). VPs may exist between:
 ATM end points (as between CPN 1 and CPN 2 and between CPN 2 and CPN 3).
 ATM nodes and ATM end points (as between NN 1 and CPN 1, NN 1 and CPN 2, and NN 2 and CPN 3).
 ATM nodes (as between NN 1 and NN 2).

A VP may be routed through an ATM node by reference only to the VP number or it may terminate in an ATM node. A VP entering an end point always terminates in that end point. The concepts of Virtual Path (VP) and Virtual Path Connection (VPC) will be considered as identical in the present description.

Virtual Channel (VC): The concept of a Virtual Channel is defined in ATM as an unidirectional connection between end users.

Virtual Channel Connection (VCC): A Virtual Channel Connection is the end-to-end connection along which a user sends data. While a VCC is defined to be unidirectional, it must be noted that VCCs always occur in pairs, one VCC in each direction. Thus a bidirectional communication channel consists of a pair of VCCs (that have to follow the same physical path through the network).

The concepts of VC and VCC are likewise almost the same. The acronym VC is most often used in a generic context and VCC in much more specific ways.

Virtual Channel Link (VCL): A Virtual Channel Link is a separately identified data flow within a link or a virtual path. A Virtual Channel Connection (VCC) through the network is a sequence of interconnected (concatenated) VCLs.

The relationship between links, Vps and Vcs is summarized in FIG. 3:

VPs within links: Within each link there are a number of VPs. The maximum number is defined by the number of bits allocated of Virtual Path Identifiers (VPIs) within the ATM cell header.

VCs within VPs: Each VP has a number of Vcs within it. The maximum number is restricted by the number of bits allocated to Virtual Channel Identifiers (VCIs) within the cell header.

As far as the architecture of ATM is concerned, each link may have all possible VPs and each VP may have all possible VCs within it.

Each Virtual Connection has a given Quality of Service (QoS) characteristic associated with it. This quality of service specifies an average bandwidth as well as a maximum peak (instantaneous) allowed bandwidth. In serious overload situations, when the network cannot recover from overload by discarding only cells marked as low priority, the network can select which cells to discard depending on the quality of service characteristic on the VC. A VP also has a quality of service associated with it. VCs within a VP may have a lower quality of service than the VP but they cannot have a higher one.

ATM Services

ATM (Asynchronous Transfer Mode) technology is intended to support a wide variety of services and applications. The control of ATM network traffic is fundamentally related to the ability of the network to provide appropriately differentiated quality of service for network applications. ATM specifications define procedures and parameters related to traffic management and quality of service. A primary role for traffic management is to protect the network and the end-system from congestion in order to achieve network performances objectives. An additional role is to promote the efficient use of network resources.

A set of five service categories are specified. For each one, a set of parameters is given to describe both the traffic presented to the network, and the quality of service which is required of the network. A number of traffic control mechanisms are defined, which the network may utilize to meet the quality of service objectives.

As described in the ATM Forum—Technical Committee—"Traffic Management Specification"; Version 4.0 April 1996, the architecture for services provided at the ATM layer consists of the following service categories:

CBR: Constant Bit Rate

VBR: real-time/non-real-time Variable Bit Rate

UBR: Unspecified Bit Rate

ABR: Available Bit Rate

These service categories relate traffic characteristics and quality of service requirements to network behaviour. Functions such as routing, Connection Admission Control (CAC), and resource allocation are, in general, structured differently for each service category. Service categories are distinguished as being either real-time (CBR and RT-VBR) or non-real time (NRT-VEBR, UBR, ABR). For real-time traffic, there are two categories, CBR and real-time VBR, distinguished by whether the traffic descriptor contains only the Peak Cell Rate (PCR) or both PCR and the Sustainable Cell Rate (SCR). All service categories apply to both Virtual Channel Connections (VCCs) and Virtual Path Connections (VPCs). Throughout the present description, the term "connection" refers to either VCCs or VPCs.

The ATM layer quality of service (QoS) is measured by a set of parameters characterizing the performance of an ATM layer connection:

1. Peak to peak Cell Delay Variation (peak to peak CDV)

2. Maximum Cell Transfer Delay (maxCTD)

3. Cell Loss Ratio (CLR)

These quality of service parameters quantify end to end network performance at the ATM layer. Each of the following service categories has one or more conformance definition distinguished by the manner in which the quality of service parameters apply to the cell flows.

Constant Bit Rate (CBR) Service

The Constant Bit Rate service category is used by connections that request a static amount of bandwidth that is continuously available during the connection lifetime. This amount of bandwidth is characterized by a Peak Cell Rate (PCR) value.

The basic commitment made by the network to a user who reserves resources via the CBR capability is that once the connection is established, the negotiated ATM layer quality of service is assured to all cells when all cells are conforming to the relevant conformance tests in the CBR capability, the source can emit cells at the Peak Cell Rate at any time and for any duration and the quality of service still pertain.

CBR services is intended to support real-time applications requiring tighly constrained delay variation (e.g., voice, video, circuit emulation) but is not restricted to these applications. In the CBR capability, the source may emit cells at, or below the negotiated Peak Cell Rate (and may also even be silent), for periods of time. Cells which are delayed beyond the value specified by the maximum cell transfer delay (maxCTD) are assumed to be significantly reduced value to the application.

The CBR service category may be used for both VPCs (Virtual Path Connections) and VCCs (Virtual Channel Connections).

Real-Time Variable Bit Rate (RT-VBR) Service

The real-time VBR service category is intended for real-time applications, i.e., those requiring tightly constrained delay and delay variation, as would be appropriate for voice and video applications. RT-VBR connections are characterized in terms of a Peak Cell Rate (PCR), Sustainable Cell Rate (SCR), and Maximum Burst Size (MBS). Sources are expected to transmit at a rate which varies with time. Equivalently the source can be described as "bursty". Cells that are delayed beyond the value specified by maxCTD are assumed to be of significantly reduced value to the application. Real-time VBR service may support statistical multiplexing of real-time sources.

Non-Real-Time Variable Bit Rate (NRT-VBR) Service

The non-real-time VBR service category is intended for non-real-time applications which have bursty traffic characteritics and which are characterized in terms of a Peak Cell Rate (PCR), Sustainable Cell Rate (SCR), and Maximum Burst size (MBS). For those cells which are transferred within the traffic contract., the application expects a low cell loss ratio. Non-real-time VBR service may support statistical multiplexing of connections. No delay bounds are associated with this service category.

Unspecified Bit Rate (UBR) Service

The Unspecified Bit Rate (UBR) service category is intended for non-real-time applications, i.e., those not requiring tightly constrained delay and delay variation. Examples of such applications are traditional computer communications applications, such as file transfer and email.

UBR service does not specify traffic related service guarantees. No numerical commitments are made with respect to the Cell Loss Ratio (CLR) experienced by a UBR connection, or as to the Cell Transfer Delay (CTD) experienced by cells on the connection. A network may or may not apply Peak Cell Rate to the Connection Admission Control (CAC) and Usage Parameter Control (UPC) functions. In the case where the network does not enforce Peak Cell Rate (PCR), the value of Peak Cell Rate is informational only. When Peak Cell Rate is not enforced it is still useful to have Peak Cell Rate (PCR) negotiated, since this may allow the source to discover the smallest bandwidth limitation along the path of the connection. Congestion control for UBR may be performed at a higher layer on an end to end basis. The UBR service is indicated by use of the Best Effort Indicator in the ATM User Cell Rate Information Element.

Available Bit Rate (ABR) Service

ABR is an ATM layer service category for which the limiting ATM layer transfer characteristics provided by the network may change subsequent to connection establishment. A flow control mechanism supports several types of feedback to control the source rate in response to changing ATM layer transfer characteristics. This feedback is conveyed to the source through specific control cells called Resource Management cells, or RM-cells. It is expected that an end-system that adapts its traffic in accordance with the feedback will experience a low cell loss ratio and obtain a fair share of the available bandwidth according to a network specific allocation policy. The ABR service does not require bounding the delay or the delay variation experienced by a given connection. ABR service is not intended to support real-time applications.

On the establishment of an ABR connection, the end-system shall specify to the network both a maximum required bandwidth and a minimum usable bandwidth. These shall be designated as Peak Cell Rate (PCR), and the Minimum Cell Rate (MCR) respectively. The MCR may be specified as zero. The bandwidth available from the network may vary, but shall not become less than the Minimum Cell Rate (MCR).

Generic Control Functions

The following functions are defined for managing and controlling traffic and congestion in ATM networks and may be used in appropriate combinations depending on the service category:

- Connection Admission Control (CAC) is defined as the set of actions taken by the network during the call set up phase in order to determine whether a connection request can be accepted or should be rejected (or whether a request for re allocation can be accommodated). Based on the CAC function, a connection request is progressed only when sufficient resources are available at each successive network element to establish the connection through the whole network based on its service category, traffic contract, and quality of service, and in order to maintain the agreed quality of service of existing connections.
- Feedback controls are defined as the set of actions taken by the network and by end systems to regulate the traffic submitted on ATM connections according to the state of the network.
- Usage Parameter Control (UPC) is defined as the set of actions taken by the network to monitor and control traffic, in terms of traffic offered and validity of the ATM connection, at the end system access.
- Traffic shaping may be used to achieve a desired modification of the traffic characteristics. The traffic shaping is a mechanism that alters the traffic characteristics of a stream of cells on a connection to achieve better efficiency whilst meeting the quality of services objectives, or to ensure conformance at a subsequent interface. Examples of traffic shaping are peak cell rate reduction, burst length limiting, reduction of Cell Delay Variation (CDV) by suitably spacing cells in time, and cell scheduling policy.
- Explicit Forward Congestion Indication (EFCI) may be set by a network element in an impending congested state or a congested state in the cell header so that this indication may be examined by the destination end system. For example the end system may use this indication to implement a protocol that adaptively lowers the cell rate of the connection during congestion or impending congestion. A network element that is not in a congested state or an impending congested state will not modify the value of this indication. An impending congested state is the state when a network element is operating around its engineered capacity level.
- ABR Flow Control protocol may be used to adaptively share the available bandwidth among participating users. In the ABR service, the source adapts its rate to changing conditions. Information about the state of the network like bandwidth availability, stte of congestion, and impending congestion, is conveyed to the source through special control cells called Resource Management Cells (RM-cells).

etc . . .

Available Bit Rate Service Category (ABR)

Nature of the Service Guarantees

The ABR service category provides a low cell loss ratio for those connections whose end-stations obey a specified reference behaviour. No numeric commitment is made about cell transfer delay. If the end points fail to observe the reference behaviour, the cell loss ratio is not guaranteed. Fairness among connections is assumed, modified by the MCR (Minimum Cell Rate), local policy in network elements, and a potentially significant error term.

Mechanism

The ABR service is inherently closed loop. The source performs dynamic traffic shaping based on feedback received from the network. This behaviour may be enforced by the network using Usage Parameter Control (UPC). A Minimum Cell Rate (MCR) is negotiated. If the MCR is non zero, then it is assumed that resources are reserved in network nodes to ensure that the feedback never causes the available cell rate to fall below the MCR, and that low Cell Loss Ratio (CLR) is achieved; thus, Connection Admission Control (CAC) is provided in the network. Local policy in network elements contributes to fairness and isolation, with the objective of achieving low Cell Loss ratio (CLR) for those connections which obey the source behaviour.

Flow Control Model

ABR flow control occurs between a sending end system (source) and a receiving end system (destination). sources and destinations are connected via bidirectional connections. For a bi-directional ABR connection, each connection termination point is both a source and a destination. For the sake of simplicity, only the information flow from the source to the destination with its associated Resource Management cell (RM-cell) flows is considered. The forward direction is the direction from the source to the destination, and the backward direction is the direction from the destination to the source. As shown in FIG. 4, for the forward information flow from the source (S) to the destination (D), there is a control loop consisting of two RM-cell flows, one in the forward direction and one in the backward. A source (S) generates forward RM-cells which are turned around by the destination (D) and sent back to the source as backward RM-cells. these backward RM-cells carry feedback information provided by the network elements (NE) and/or the destination back to the source. A network element/node (NE) may:

- Directly insert feedback control information into RM-cells when they pass in the forward or backward direction.

Indirectly inform the source about congestion by setting the EFCI bit in the data cell header of the cells of the forward information flow. In this case, the destination will update the backward RM-cells based on this congestion information.

Generate backward RM-cells.

RM-cell Fields

A Resource Management cell comprises, in particular, the following fields:

Header: standard ATM header.

ID: the protocol ID identifies the service using the RM-cell.

Message Type:
DIR: the DIR (Direction) field indicates which direction forward or backward) of data flow as associated with the RM-cell.
BN: the BN field indicates whether the RM-cell is a Backward Explicit Congestion Notification (BECN) cell or not.
CI: the CI (Congestion Indication) field allows a network element to indicate that there is congestion in the network.
NI: the NI (No Increase) field is used to prevent a source from increasing its Allowable Cell Rate (ACR).
ER: the ER (Explicit Rate) field is used to limit the source ACR (Allowed Cell Rate) to a specific value. For each RM-cell, ER is set by the source to a requested rate (such as PCR—Peak Cell Rate). It may be subsequently reduced by any network element in the path to a value that the element can sustain.
CCR: the CCR (Current Cell Rate) field is set by the source to its current ACR.
MCR: the MCR (Minimum Cell Rate) field carries the connection's Minimum Cell rate. It may be useful to network elements in allocating bandwidth among connections.

Backbone and Access Networks

FIG. 17 is a general view of an ATM network comprising a ATM backbone network and a plurality of ATM access networks (access networks 1, 2, 3, 4, 5), each ATM access network comprising one or a plurality of source nodes (node 1) and/or destination nodes (node 8) connected to one or several end users (users 1, 2). Generally, ATM access networks are private ATM networks called "customer premises networks" and indeed they are very often confined to a local area such as a building or a campus. However, a private ATM network can be distributed over a wide area by the use of carrier (non-ATM) links between ATM nodes. The ATM backbone network is generally a public ATM network but can also be part of a private ATM network using lines leased from a carrier such as the PTT.

FIG. 9 shows the establishment of a Virtual Path Connection and Virtual Channel Connections through respectively the backbone and the source and destination access networks according to the present invention. When end user 1 wants to communicate with end user 2:

A Virtual Channel Connection (VCC1) is established from user 1 to node 2.

A Virtual Path Connection (VPC) is established between access nodes 2 and 5 within the backbone network. This Virtual Path Connection (VPC) transmits up to node 5 the traffic of end user 1 together with the traffic of several other end users (VCC3 . . . ).

In node 5, the traffic is discriminated according to its destination. The traffic generated by end user 1 is transmitted through a Virtual Channel Connection VCC2 from node 5 to end user 2.

The present invention relates to a method and system for fairly allocating, among different connections (VCC1, VCC3 . . . ) requiring different quality of service, the bandwidth of an Available Bit Rate (ABR) or a bandwidth adjustable Continuous Bit Rate (CBR) Virtual Path Connection (VPC) established on an ATM backbone network.

Available Bit Rate Virtual Path Connection (ABR VPC)

FIG. 10 shows how ATM access networks and the ATM backbone network communicate together using RM-cells in the context of an ABR VPC set-up in the backbone network.

1. An Available Bit Rate Virtual Path Connection (ABR VPC) is set up between the end node (node 2) of the source access network (access network 1) and the end node (node 5) of the destination access network (access network 2).

2. The origin node of the ABR VPC (node 2: end node of the ATM access network) generates Resource Management cells (RM-cells) and sends them to the first node of the destination access network (node 5).

3. This access node (node 5) turns around the RM-cells and sends them back to the origin node (node 2) as backward RM-cells. The successive nodes in the ATM backbone update the backward RM-cells with information concerning the bandwidth/rate available/allowed for the ABR VPC. The RM-cells are then used to provide a flow control interface between the access network and the bakbone network.

If a RM-cell is received by the origin node (node 2) of the ABR VPC with a new bandwidth notification, the traffic will be adjusted according to the new availability of the network:

If a bandwidth decrease is notified, traffic sources will have to limit their traffic to avoid cells loss in the origin node (node 2) of the ABR Virtual Path Connection (VPC).

If a bandwidth increase is notified, traffic sources will be informed that it is possible to generate more traffic.

Bandwidth Adjustable Continuous Bit Rate Virtual Path Connection (CBR VPC)

FIGS. 16 shows the traffic on a transmission link in a backbone network where voice traffic (or more generally SVCs or Switched Virtual Connections) has priority over data traffic (or more generally PVCs or Permanent Virtual Connections) issued from access networks, and more particularly where the establishment of a certain number of voice connections (SVCs) is guaranteed while allowing the remaining bandwidth on the link to be used by data traffic (PVCs) if these voice connections are not requested.

To simplify the description, it has been considered that SVCs are dedicated to voice traffic while PVCs are used for data traffic. Of course, this can be generalized to give priority to SVCs calls, whether they transport voice or data, over permanent connections (PVCs).

It is expected that the backbone network design is such that a minimum of bandwidth is left for data traffic during the peak hours. Once the voice load decreases, more bandwidth is advertised for data traffic (PVCs). FIG. 16 shows a graphical example of what is achieved. More particularly FIG. 16 shows the bandwidth that is available for data traffic. This bandwidth varies according to the voice traffic.

Within the backbone network on transmission links where voice and data are mixed, the available bandwidth fluctuates according to the number of voice connections (SVCs) which are established and disconnected within a given period of time. In practice, the backbone voice load fluctuates slowly and it is not necessary to track the establishment and disconnection of the voice connections continuously (or every X micro or milli seconds). A slow mechanism, able to adapt the bandwidth every ten seconds is sufficient. Thus, in an ATM backbone network transporting data and voice traffic issued from ATM access networks, it is possible to build Continuous Bit Rate Virtual Path Connections (CBR VPCs) in the backbone network and to slowly modify their bandwidth according to the backbone voice traffic:

If the voice traffic on the backbone network increases, the bandwidth allocated to the data CBR VPCs will decrease.

If the voice traffic on the backbone network decreases, more bandwidth will be available for the data CBR VPCs.

FIG. 7 is a general view of such an ATM network, where nodes 2 and 5 are two access nodes interfacing with the backbone network through respectively nodes 3 and 4. The PBXs 1, 2, 3, 4 access the backbone network either directly (PBX 1, 2 and 3) or through an access node (PBX4 using node 5). Traffic sources (user 1 and user 2) are connected to the ATM network through Permanent Virtual Circuits (PVCs) and a connection is established over the backbone network using access nodes 2 and 5. Nodes 2 and 5 are connected by means of a single CBR Virtual Path Connection (VPC) and the traffic of the Virtual Channel Connections VCC1 and VCC3 is transported over this VPC. In the present example, the CBR VPC is using the resources of links between nodes 2 and 3, 3 and 9, and 4 and 5. If a voice connection (SVC) is set up between PBX 1 and PBX 3 using link between nodes 3 and 9, there will be competition on this link between this voice traffic (SVC) and the Virtual Path Connection (VPC) between node 2 and node 5. If voice has the highest priority, it is important to make sure that there is always bandwidth available to accept the establishment of new voice connections (SVCs). This means:

the reduction of the bandwidth allocated to the CBR VPC (supporting PVCs) if there is not enough bandwidth available on the link, the increase of the bandwidth allocated to the CBR VPC (supporting PVCs) if there is too much bandwidth available on the link.

In order to provide an end to end service, it is necessary to provide a good "flow control" interface between the ATM backbone network, which determines the bandwidth allocated to each CBR Virtual Path Connection (VPC), and the ATM access networks, which convey the traffic from the sending end-systems (source nodes) up to the ATM backbone network. The information concerning the bandwidth available on the backbone network for a given Virtual Path Connection (VPC) is used by the nodes having access to the backbone network (nodes 2 and 5) for increasing or decreasing the transmission rate of the traffic source (user 1).

Backbone Topology

Topology Services

The topology services are used for distributing and maintaining information concerning the logical and physical backbone network (including link utilization information) in every backbone node. In the preferred embodiment (refer to IBM's NBBS architecture), this information, in particular the utilization and reservation of the bandwidth, is collected and distributed periodically to each backbone network node thanks to a control spanning tree. Each node stores in its own Topology DataBase (TDB) information about nodes, links, their properties and the bandwidth utilization and allocation. The topology information is replicated in each backbone node. An algorithm guarantees the correctness of each node's Topology DataBase when links and nodes are added or deleted or when their characteristics change.

Control Spanning Tree

The control spanning tree is a logical structure which joins all the nodes which are physically connected together in a network. It allows information that has to go to every node to be sent very quickly and efficiently. It is maintained dynamically by topology services. The spanning tree is used for:

distributing control information (in parallel) including link utilisation, and updating the Topology DataBase of the nodes with new network configurations or link/node failures.

Topology DataBase (TDB)

The Topology Database contains information about nodes, links, their properties, and the bandwidth allocation, in particular:

the physical topology of the network which includes static information like physical characteristics of nodes and links, the state of nodes and links, and the link utilisation which includes dynamic characteristics like current bandwidth (used and reserved), real-time measurements . . .

To each resource in the network, nodes or links, is associated an entry in the database. In particular, each link entry includes the following characteristics:

the link physical properties:
  transmission medium and speed,
  routing mode supported,
  maximum packet size,
  link buffer capacity,
  propagation delay,
  bandwidth reservation supported . . .
the link state:
  on-line (link can accept user connections),
  quiescent (link cannot accept additional user connections, but existing connections continue),
  off-line (link cannot accept user connections and existing connections are cancelled) . . .
the link utilization:
  real-time measurements,
  reserved bandwidth, . . .

In particular, the Topology DataBase (TDB) contains, for each link, its total capacity. The value $C_k$ represents the total bandwidth available on the link k.

Backbone Bandwidth Management Server

In order to adjust the bandwidth of each bandwidth adjustable CBR VPC, a server called Backbone Bandwidth Management Server (BBMS) is defined as shown in FIG. 18. There is one active server (other servers may be used as backup) for the whole backbone network and this centralized server has the knowledge of the network topology and traffic load. It periodically maintains and updates this information thanks to the backbone topology services described previously. The Backbone Bandwidth Management Server (BBMS) can be implemented in anyone of the nodes maintaining a Topology DataBase. The process for choosing a node to host the Backbone Bandwidth Management Server (BBMS) is out of the scope of this invention. For instance a node which is already used as root of the spanning tree, can be a good candidate to host the BBMS function. Another solution is to process the Backbone Bandwidth Management Server (BBMS) function on an independent station such as a RISC (Reduced Instruction Set Computer) station using Network Management Services to retrieve the network topology from one or other of network nodes.

The Backbone Bandwidth Management Server (BBMS) is in charge of optimizing of the network utilization. However, the backbone network is optimized a posteriori: bandwidth adjustable Continuous Bit rate (CBR) Virtual Path Connections (VPCs) are established with an initial bandwidth BI independently of the Backbone Bandwidth Management Server (BBMS). Their bandwidth is adjusted dynamically according to the fluctuations of the voice traffic (SVCs). The value of the initial bandwidth BI is defined a priori by the network administrator. The Backbone Bandwidth Management Server (BBMS):

sends requests to backbone nodes to reduce or increase the bandwidth allocated to the bandwidth adjustable Continuous Bit Rate (CBR) Virtual Path Connections (VPCs) in charge of transporting Permanent Virtual Connections (PVCs).

reroutes bandwidth adjustable CBR VPCs within the backbone network for balancing the traffic among transmission links and for ensuring fairness among VP Connections.

The Backbone Bandwidth Management Server (BBMS) is requesting services from the Connection Admission Control (CAC) for:

getting the initial bandwidth requests BI, increasing/decreasing bandwidth of bandwidth adjustable CBR VPCs, rerouting bandwidth adjustable CBR VPCs.

Connection Allocation Table

In the Backbone Bandwidth Management Server (BBMS) environment, a table called Connection Allocation Table (CAT) is defined. This table comprises an entry per connection (VPC or VCC/PVC or SVC) established in the backbone network and each entry includes information required to adjust the bandwidth of the CBR VPCs:

the VPC or VCC name, the CAC identifier to identify the CAC that owns the connection, the initial bandwidth $BI_j$ allocated to the VPC j or VCC j, the marginal bandwidth $BM_j$ currently allocated to the bandwidth adjustable CBR VPC j.

an indicator for identifying whether the connection is adjustable or constant.

Notes:

In the present description, CBR VPCs are considered as adjustable while VCCs have a constant bandwidth. However, the indicator for identifying adjustable or constant connections allows the generalization of the process.

The bandwidth which is currently allocated to a bandwidth adjustable CBR VPC j is equal to the sum of the initial bandwidth with the marginal bandwidth ($BI_j$+$BM_j$).

The bandwidth which is allocated to a VCC j/SVC j is equal to $BI_j$ (constant bandwidth).

The values $BI_j$ are exclusively related to connections j and are independent of links.

The marginal bandwidth $BM_j$ can take a positive or negative value if $BI_j$ is considered as a mean value. Another possibility is to consider $BI_j$ as the minimal bandwidth and to limit $BM_j$ to positive values.

Link Allocation Tables

In the Backbone Bandwidth Management server (BBMS) environment, a set of tables called Link Allocation Tables ($LAT_k$) is defined, one for each link k in the backbone network. Each table comprises an entry per bandwidth adjustable CBR VPC established on the link k and each entry includes information required to adjust the bandwidth of this CBR VPC:

the CBR VPC name, the marginal bandwidth $BM_{j,k}$ available for the bandwidth adjustable CBR VPC j on link k.

Bandwidth Adjustment Parameters

The Backbone Bandwidth Management Server (BBMS) maintains the following information:

1. The initial bandwidth request $BI_j$

The Connection Allocation Table (CAT) is updated with the initial bandwidth request each time a new connection (VPC/VCC) is established or an existing connection is disconnected in the backbone network:

$BI_j$ is the initial bandwidth request of connection j.

The following parameters are computed for each link k:

Sum_$BI_k$ is the sum of all initial bandwidth requests $BI_j$ of connections j using link k.

Sum_BI_$CBR_k$ is the sum of the initial bandwidth requests $BI_j$ for all bandwidth adjustable CBR VPC j on link k (obviously Sum_BI_$CBR_k$<=Sum_$BI_k$).

Note: more generally Sum_BI_$CBR_k$ is computed for every connection with an indicator set to "adjustable connection".

2. The marginal bandwidth currently allocated by the Backbone Bandwidth Management Server (BBMS). This additional bandwidth is centralized and maintained in the BBMS only.

$BM_{j,k}$ is the marginal bandwidth available for the bandwidth adjustable CBR VPC j on link k ($BM_{j,k}$ is equal to 0 for constant connections).

$BM_j$ is the marginal bandwidth allocated to the bandwidth adjustable CBR VPC j in the backbone network=$BM_j$= $\min_k (BM_{j,k})$=minimum marginal bandwidth available along the path of the connection.

Sum_$BM_k$ is the sum of the marginal bandwidths available for link k.

The bandwidth which is reserved on a given link k according to all initial requests $BI_j$ is equal to Sum_$BI_k$. This bandwidth is always lower than the link capacity $C_k$. The bandwidth allocated to a connection j is equal to the initial bandwidth request plus the minimum value of the marginal bandwidth currently available along the path of the connection ($BI_j$+$\min_k (BM_{j,k})$). The bandwidth reserved on link k is lower or equal to Sum_$BI_k$+Sum_$BM_k$.

Bandwidth Adjustment

FIG. 19 is a flow chart of a method for dynamically adjusting the bandwidth of a Continuous Bit Rate (CBR) Virtual Path Connection (VPC) according to the periodically updated PVC and SVC reservation levels:

1901. Initially, the bandwidth adjustable CBR Virtual Path Connection (VPC) j is established by an origin node in the backbone network (for instance by node 3 in FIG. 18). A route is selected according to the CBR VPC initial bandwidth request $BI_j$, the current reservation levels on the links, the CBR quality of service . . . These operations are performed by the Connection Admission Control (CAC) of the origin node. The CAC informs the Backbone Bandwidth Management server (BBMS) each time a VPC is established or disconnected.

The same operations are performed for SVCs/VCCs. The only difference is that the connection is marked as constant bandwidth in the BBMS Link Allocation Tables ($LAT_k$).

1902. Each time a new connection is established, the Backbone Bandwidth Management Server (BBMS) updates the Connection Allocation Table (CAT) with the initial bandwidth request $BI_j$ and intitialize the marginal bandwidth in the Link Allocation Tables to a value 0.

1903. In its background process, on a continuous or periodical mode, the Backbone Bandwidth Management Server (BBMS) monitors, for each link k, the reservation levels of the bandwidth adjustable CBR VPCs and constant bandwidth connections (SVCs). It determines the level of additional bandwidth that can be allocated to each bandwidth adjustable CBR VPCs:

$$BM_{j,k} = (C_k - \text{Sum\_}BI_k) \times BI_j / \text{Sum\_}BI\_CBR_k \quad (1)$$

The above expression determines the amount of unallocated bandwidth on the link k which is equal to ($C_k$−Sum_ $BI_k$) and gives a fair share of this bandwidth to every bandwidth adjustable CBR VPCs. Here, the share is proportional to the initial bandwidth requests $BI_j$.

The Link Allocation Tables ($LAT_k$) are updated with the computed marginal bandwidths $BM_{j,k}$.

1904. The marginal bandwidth that can be allocated to a bandwidth adjustable CBR VPC is actually the minimum that each link k can accept along the path of the connection:

$$\text{new\_}BM_j = \min_k(BM_{j,k}).$$

1905. A test determines whether a significant change is observed in new_$BM_j$ or not:

absolute value of (new_$BM_j$−$BM_j$)>given threshold?

1906. If yes, the Backbone Bandwidth Management Server (BBMS) requests the Connection Admission Control (CAC) of the origin node to adjust the bandwidth with the new bandwidth ($BI_j$ +$BM_j$). The BBMS also updates the Connection Allocation Table (CAT) with the new value $BM_j$.

1907. Otherwise, the current value of $BM_j$ remains unchanged.

1908. The Connection Admission Control (CAC) receives the value of the new bandwidth from BBMS.

1909. The Connection Admission Control (CAC) adjusts the bandwidth allocated to the bandwidth adjustable CBR VPC by:

1910. reducing the bandwidth of the bandwidth adjustable CBR VPC if the new bandwidth is lower than the previous one,

1911. increasing the bandwidth of the bandwidth adjustable CBR VPC if the new bandwidth is higher than the previous one.

Note: The expression (1) is quite simplistic but can be improved taking into consideration:

a protection against overbooking to make sure at least a few voice connections (SVCs) can be accepted at any time before the Backbone Bandwidth Management Server (BBMS) performs the post-optimization. This protection may not be required. If required, this protection is achieved by defining a link speed/capacity that is lower than the actual link speed/capacity. The new expression is:

$$BM_{j,k} = (C'_k - \text{Sum\_}BI_k) \times BI_j / \text{Sum\_}BI\_CBR_k \quad (1)$$

with $C'_k$=actual link capacity−bandwidth for anticipated voice connections (SVC calls).

a minimum bandwidth reserved for bandwidth adjustable CBR VPCs. This bandwidth is to be taken into account in the path selection process for voice connections (SVC calls).

Fairness and Load Balancing

In its background process, but with a lower frequency (for instance every 10 minutes), the Backbone Bandwidth Management Server (BBMS) monitors the network reservation levels to make sure that the network is correctly balanced or that bandwidth is fairly shared among bandwidth adjustable CBR Virtual Paths Connections (VPCs). The criteria is:

either a too large difference between the current allocated bandwidth and the initial bandwidth request $BM_j$<given negative threshold If the criteria is met, the bandwidth adjustable CBR VPC is rerouted or a too large difference of bandwidth allocation between Virtual Path Connections:

$\max_j((BI_j+BM_j)/BI_j) - \min_1((BI_j+BM_j)/BI_j) >$ given threshold where the given threshold defines the level of tolerance.

If the criteria is met, the bandwidth adjustable CBR VPC with the lowest additional bandwidth $BM_j/BI_j$ is rerouted first.

In both cases, the reroute request in the Connection admission Control (CAC) triggers a new path selection process to re-optimize the bandwidth allocation within the backbone network:

If a better path cannot be found, the bandwidth adjustable CBR Virtual Path Connection (VPC) remains with its current allocation, If a better path can be found, a Non Disruptive Path Switch (NDPS) occurs to take advantage of the new path.

Learning Curve

To improve the network response time and to make sure all voice connections (SVC calls) are accepted at peak hours, statistics are recorded along the day and the behaviour of these voice connections is simulated. This allows the Bandwidth Management Server to anticipate the SVC requests and to reduce the bandwidth allocated to bandwidth adjustable CBR Virtual Path Connections (VPCs) before the demand actually occurs.

CBR VPC Bandwidth Updates

When the bandwidth of the CBR VPC varies, the VPC source (node 2) may be informed of this change:

either implicitly, by observing the packet/cell loss rate for instance, or explicitly.

In the latter case, as the Virtual Path Connection (VPC) is defined for a Constant Bit Rate (CBR) service category, the ATM Available Bit Rate (ABR) mechanism is not adapted. However, referring back to FIG. 18, the node 3 at the edge of the backbone network can send a RM-cell (RM-cell identical to ABR RM-cells or RM-cell with a proprietary format) to access node 2. This RM-cell transmits the new transmission rate or new bandwidth allocated by the Backbone Bandwidth Management Server (BBMS) to the bandwidth adjustable CBR VPC. The function of the access node 2 is at least to adjust the shaper of the bandwidth adjustable CBR VPC according to the new allocated bandwidth. The access node can then take various actions on the ATM Virtual Channel Connections (VCCs) that are multiplexed over the CBR VPC. For instance, it can:

act as an ABR Virtual Destination for some VCCs, reduce or increase arbitrarily the bandwidth on some VCCs, drop some VC Connections in case of bandwidth reduction, trigger the Explicit Forward Congestion Indication (EFCI),

. . .

The present application proposes a process for fairly and dynamically sharing the bandwidth of the bandwidth adjustable CBR VPC among the different VCCs it transports. This process will be discuss in detail hereafter.

CBR VPC With ABR VPC Interface

FIG. 11 shows how ATM access networks and the ATM backbone network communicate together using standard RM-cells in the context of a CBR VPC in the backbone accessed by an ABR VPC:

1. An Available Bit Rate Virtual Path Connection (ABR VPC) is set up between the end node (node 2) of the source access network (access network 1) and the first backbone node connected to it (node 3: backbone access node). RM-cells within this ABR VPC may be generated at wide intervals of time, because the ABR VPC bandwidth is adjusted in accordance with the slow variations of the CBR VP bandwidth.

2. The origin node of the ABR VPC (node 2: end node of the ATM access network) generates Resource Management cells (RM-cells) and sends them to the first backbone node connected to it (node 3: backbone access node).

3. The access node of the ATM backbone network (node 3) updates the RM-cells with the bandwidth/rate allocated by the Connection Admission Control (CAC) to the CBR VP and sends them back as backward RM-cells to the origin node (node 2) of the ABR VPC. The ABR RM-cells are then used to provide a flow control interface between the source access network and the backbone network.

If a RM-cell is received in the origin node (node 2) of the ABR VPC with a new bandwidth notification, the traffic will be adjusted according to the new availability of the network:

If a bandwidth decrease is notified, traffic sources will have to limit their traffic to avoid cells loss in the origin node (node 2) of the ABR Virtual Path Connection (VPC).

If a bandwidth increase is notified, traffic sources will be informed that it is possible to generate more traffic.

The object of the present invention is to fairly share the bandwidth of the Available Bit Rate (ABR) or bandwidth adjustable Continuous Bit Rate Virtual Path Connection (VPC) among the plurality of Virtual Channel Connections of different service categories it supports (CBR, VBR, ABR, . . . ).

Bandwidth Management

Virtual Channel Connections (VCCS)

As shown in FIG. 8, an Available Bit Rate (ABR) or a bandwidth adjustable Continuous Bit Rate (CBR) Virtual Path Connection (VPC) can transport a plurality of Virtual Channel Connections (VCCs) using different service categories:

(a) CBR Connections.

At connection set-up, the bandwidth corresponding to the Peak Cell Rate (PCR) value (=mean rate) of the connection is allocated along a preselected path in the ATM access network.

(b) ATM or Frame Relay (ATM/FR) Fixed Bandwidth (Classical) Connections

At connection set up, a bandwidth is allocated along a preselected path in the ATM access network. The allocated bandwidth remains unchanged during all the life of the connection.

(c) Reserved Connections With Bandwidth Adjustment Option (NBBS—Networking BroadBand Services—Connections)

At connection set up, a bandwidth is allocated along a preselected path in the ATM access network. The allocated bandwidth is based on an initial mean rate. Then, depending on the behaviour of the source, measured by a policing module, the bandwidth of the VCC is adjusted (increased or decreased). The initial mean rate of the connection normally corresponds to the long term mean rate which is estimated for the connection. A minimum bandwidth reservation can be specified. Additional information concerning NBBS can be found in publication entitled "Networking Broadband Services (NBBS)—Architecture Tutorial", IBM International Technical Support Centers, June 1995, GG24-4486-00.

(d) Frame Relay or ATM Non Reserved Connections

Frame Relay or ATM connections can be totally non reserved (Unspecified Bit Rate UBR for ATM) or non reserved with a minimum bandwidth reservation (ABR for ATM). The bandwidth allocated to these connection is either null or equal to the minimum cell rate (MCR for ABR).

End Nodes in ATM Access Networks

The present method of sharing bandwidth among connections of different categories in a given ABR or CBR Virtual Path Connection (VPC) is implemented in end nodes (node 2) of ATM access networks. Assuming that in said end nodes, there is a switch and a resource called "adapter" in charge of managing a given outgoing link or group of outgoing links, the method is implemented in the adapter responsible for the link supporting the Virtual Path Connection (VPC). Generally, an adapter comprises three parts:

Two parts for processing the data traffic (switching/flow control functions), namely the receive and transmit elements;

one part based on a processor, namely in a preferred embodiment a general purpose processor in charge controlling the emission and reception of the traffic. This processor comprises a module called "Virtual Path Connection Manager" (VPCM), dedicated to the control and management of the Virtual Path Connections (VPC) originated from the adapter. It is an implementation choice as to whether there is one VPCM per adapter or one VPCM per link. In the present embodiment, we will assume that there is one VPCM per link.

Virtual Path Connection Manager

In VPC source nodes, each Virtual Path Connection Manager (VPCM) monitors the bandwidth of the VPCs established on the link they are responsible for. The bandwidth information of these VPCs are updated and maintained in a table named Virtual Path Connection Table (VTCT). This table, one per link, comprises one entry for each connection with reserved bandwidth. VPCMs also determine the total amount of bandwidth which is allocated for each service category (CBR, VBR, ABR . . . ) on the link. The total bandwidth reserved for a specific service category is equal to the sum of the bandwidth reserved for each connection using said service category. Finally, VPCMs are responsible for signalling to a table known as the Topology DataBase (TDB) all information related to the bandwidth allocation of links. The Topology DataBase is updated each time a significant change in the bandwidth allocation of a link occurs and messages are sent to all other network nodes to update their own Topology DataBase.

Bandwidth Adjustment

FIG. 13 describes the bandwidth adjustment mechanism and in particular the relationship within a given adapter between the receive element which receives the backward RM-cells and the transmit element which sends the traffic on the ABR or CBR Virtual Path Connection:

1301. The receive element receives from the ATM backbone network a RM-cell associated to a particular ABR (standard RM-cell) or bandwidth adjustable CBR (proprietary RM-cell) VPC and extracts the transmission rate from the Congestion Indication (CI), No Increase (NI), and/or Explicit Rate (ER) . . .

1302. This transmission rate transported by the RM-cell in the CI, NI, ER . . . fields is transmitted to the Virtual Path Connection Manager (VPCM).

1303. The Virtual Path Connection Manager (VPCM) re-initializes the shaper for the corresponding VPC, computing new shaping rates, and updating the VPC "allocated bandwidth" field in the Virtual Path Connection Table (VPCT).

1304. From the bandwidth newly allocated to the VPC, the bandwidth of each VCC within this VPC is re-evaluated, based on the values maintained in the VPCT. The process in explained in FIG. 15.

When the bandwidth of an ABR or CBR Virtual Path Connection (VPC) is modified, the Virtual Path Connection Manager (VPCM) is in charge of computing the new bandwidth allocated to each Virtual Channel Connection (VCC) according to the new VPC bandwidth. In a preferred embodiment, a shaping function is provided to the transmit part of the adapter, in order to limit the transmission rate of the existing traffic to a predefined value.

Virtual Path Connection Table

In VPC source nodes, each Virtual Path Connection Manager (VPCM) monitors the bandwidth of the VPCs established on the link they are responsible for. In particular they update the Virtual Path Connection Table (VPCT) each time:

a Virtual Path Connection (VPC) is established or disconnected on the backbone network, a Virtual Channel Connection (VCC) is established, disconnected, or adjusted. In this case, the information related to the allocation and utilization of the bandwidth of the corresponding VPC (the one which includes the VCC) is updated.

the bandwidth of the Virtual Path Connection (VPC) is adjusted (at the reception of the backward RM-cells returned from the backbone).

As shown in FIG. 14, for each Virtual Path Connection (VPC) established on the link it is responsible for, the Virtual Path Connection Manager (VPCM) stores and updates in the Virtual Path Connection Table (VPCT) among other information, the following parameters (values are given as example for VPC1 on link 1):

A: the bandwidth used by reserved fixed bandwidth connections (a & b, 3 Mbps),

B: the bandwidth used by reserved adjustable bandwidth connections (c, 25 Mbps), C: the bandwidth reserved for fixed bandwidth connections (a & b, 5 Mbps), D: the bandwidth reserved for bandwidth adjustable connections (c, 43 Mbps).

E: the sum of the minimum bandwidth reservation allocated to reserved connections (a, b & c, 15 Mbps)=sum of the bandwidth allocated to fixed bandwidth connections (a & b) plus minimum bandwidth reservation allocated to bandwidth adjustable connections (c).

F: the sum of the minimum bandwidth reservation allocated to ABR connections (d) (sum of MCRs: 2 Mbps).

G: the total bandwidth used (a, b, c & d, 50 Mbps).

H: the total bandwidth allocated (H=C+D+F=63 Mbps)

I: the number of non reserved Virtual Channel Connections (100 connections).

Note: For non reserved (NR) traffic, the Virtual Path Connection Manager (VPCM) includes the sum of the minimum reservation of the Available Bit Rate/Frame Relay (ABR/FR) connections if any, and the total number of non reserved connections VCC s routed through this link.

Periodically, or at particular events, the Virtual Path Connection Manager (VPCM) reports to the Topology DataBase (TDB) of the node, the status of the link under its responsibility, in term of allocated bandwidth for each category of service. The Topology DataBase (TDB) is used to select an optimum path for new connections based on the category of service and the status of resources within the network.

Bandwidth Allocation and Optimization

FIG. 15 is a flow chart of the bandwidth allocation process:

1500. On reception of a RM-cell from an ABR or a bandwidth adjustable CBR Virtual Path Connection (VPC) with a Congestion Indicator (CI) field or/and a No Increase (NI) field, or/and Explicit Rate (ER) field indicating a new transmission rate (new_H), the Virtual Path Connection Manager (VPCM) operates as follows:

1501. A test determines whether the new bandwidth (new_H) is higher than the previously allocated bandwidth (H) or not:

1502. If the new bandwidth (new_H) is higher than the previously allocated bandwidth (H), the reserved VC Connections with bandwidth adjustment option (c), requesting additional bandwidth will be satisfied in priority. The VPCM waits for the complete adjustment of these reserved VC Connections (by means of a timer) before computing a new "non reserved" transmission rate for non reserved VC Connections (d). This transmission rate may be higher or lower than the previous one according to the requirements of the reserved VC Connections with the bandwidth adjustment option (c).

After adjustment of the reserved VC Connections (c) (at timer expiration), the available bandwidth or unused bandwidth, which is equal to the difference between the link capacity and the bandwidth actually used:

Link capacity−(A+B)

is measured. The bandwidth that "non reserved" VC Connections (d) can use above their minimum bandwidth (F) is equal to:

Link capacity−(A+B+F)

This total amount of bandwidth is then shared among the "non reserved" VC Connections (d) according to any ER computation algorithm (for instance EPRCA, ERICA—appendix I of ATM Forum Traffic Management Specifications Version 4.0).

If the new bandwidth (new_H) is lower than the previously allocated bandwidth (H), the VPCM:
- 1503. computes the difference (DB) between the new bandwidth (new_H) and the previously allocated bandwidth (H):

$DB = H - \text{new\_}H$

- 1504. verifies whether the total reserved bandwidth (C+D+F) for all connections on the link which is equal to:
  - (C) reserved bandwidth for reserved fixed bandwidth VC Connections (a, b)+
  - (D) reserved bandwidth for reserved bandwidth adjustable VC Connections (c)+
  - (F) minimum reserved bandwidth for "non reserved" VC Connections (d) (ATM ABR or FR non reserved)

is always lower than the new bandwidth (new_H), or not:
  - 1505. If yes, the bandwidth of reserved VC Connections (a, b, c) and the reservable part of "non reserved" VC Connections (d) remain unchanged. The non reserved part of connections is calculated again.
  - 1506. If no, the non reserved part of the "non reserved" VC Connections (d) must be removed (no bandwidth allocated to "non reserved" VC Connections on top of the minimum reserved (MCR)).
  - 1507. the additional bandwidth that must be freed is equal to:

$DB' = (C+D+F) - \text{new\_}H$

Note that here DB' is always higher than 0 because C+D+F>new_H (step 1504).

A ratio must be applied to the reserved part of the VC Connections, assuming a certain priority among these connections: reserved VC Connections with adjustable bandwidth (c) are impacted.

- 1508. Assuming (E) the sum of the minimum bandwidths of the reserved VC Connections with constant (a, b) or adjustable bandwidth (c), and (C+D), the sum of the current reserved bandwidths, the VPCM computes the adjustable reserved bandwidth of VC Connections (d):

$(C+D-E)$ and compares the result with DB':
- 1509. if (C+D−E)>DB', then the bandwidth for the reserved VC Connection i (c) becomes:

new_reserved bandwidth (i)=(old_reserved bandwidth (i)−minimum bandwidth reservation (i))×$DB'/(C+D-E)$+minimum bandwidth reservation (i)

The ratio R:

$R = (\text{new\_reserved bandwidth}(i) - \text{minimum reserved bandwidth}(i)) / (\text{old\_reserved bandwidth}(i) - \text{minimum reserved bandwidth}(i))$ $R = DB'/(C+D-E)$ is sent to the sources (ATM/FR access nodes) in order for them to modify in view of this ratio the bandwidth allocated to their reserved VC Connections (c) on top of the minimum bandwidth reservation. The new connection bandwidth is computed as follows in the access nodes:

minimum bandwidth reservation (i)+$R$×(old_reserved bandwidth (i)−minimum bandwidth reservation (i))

- 1510. if (C+D−E)<DB', then:

new_reserved bandwidth (i)=minimum bandwidth reservation (i)

At this level, all the adjustable bandwidths have been reduced to their minimum:
  - there is no non reserved bandwidth on top of the minimum reserved rate (MCR) for "non reserved" VC Connections (d), and
  - there is no bandwidth allocated on top of the minimum bandwidth reservation for bandwidth adjustable reserved VC Connections (c).

- 1511. The next step consists in preempting VC Connections (a, b, c, or d), based on the level of priority in accordance with the network architecture used. For example, the NBBS (Networking Broadband Services) architecture provides two levels of priority (low priority and high priority). In the preferred embodiment, it is assumed that the last case will not arrive, and could anyway be avoided with a judicious setting of the minimum rates of the connections. For real time (RT) and non real time (NRT) constant bandwidth Virtual Channel Connections (VCCs) (a, b), it is assumed that there will be always sufficient bandwidth left to the bandwidth adjustable Virtual Path Connection (VPC) required to transport such connections.

Conclusion

While the present invention has been described in the context of Available Bit Rate (ABR) or bandwidth adjustable Continuous Bit Rate (CBR) Virtual Paths Connections (VPCs), its scope of utilization can be enlarged to all types of bandwidth adjustable Virtual Path Connections (VPCs). Currently, only ABR VPCs allow the transmission back to a source of feedback control information in view of adjusting the bandwidth. However, the claimed method and system of sharing the bandwidth of an ABR or bandwidth adjustable CBR Virtual Path Connection (VPC) is adapted to all categories of VPCs characterized with a dynamic adjustment of the bandwidth (in particular, adjustable Constant Bit Rate (CBR) connections) if in the future such VPCs were to be defined in a standard or in a proprietary network architecture.

While the invention has been particularly shown and described with reference to a preferred embodiment, it will be understood that various changes in form and detail may be made therein without departing from the spirit, and scope of the invention.

What is claimed is:

1. A method of sharing among a plurality of virtual channel connections (VCCs) the bandwidth of a bandwidth adjustable virtual path connection (VPC) established between a source node (node 2) and a destination node (node 5) within a packet or cell switching network comprising a plurality of nodes interconnected with transmission links, said virtual channel connections comprising bandwidth adjustable reserved virtual channel connections (c) with minimum bandwidth reservation and/or reserved virtual channel connections (a, b) and/or non reserved virtual channel connections (d) with minimum bandwidth reservation, or/and totally non reserved connections (d) without minimum bandwidth reservation, said method characterized in that it involves in the source node (node 2) of the bandwidth adjustable virtual path connection the steps of:

receiving a notification indicating a new bandwidth available for the bandwidth adjustable virtual path connection;

adjusting the bandwidth of the virtual channel connections according to said new bandwidth;
if said new bandwidth (new_H) is lower than the sum of the current reserved bandwidth (C+D+F) of each virtual channel connection (a, b, c, d), said step of adjusting the bandwidth of these virtual channel connections comprises the step of:
reducing the current reserved bandwidth of each bandwidth adjustable virtual channel connection (c) by applying a ratio (R) to the part of the current bandwidth reserved above the minimum bandwidth reservation so that for each bandwidth adjustable virtual channel connection (i):

new reserved bandwidth (i)=(current reserved bandwidth (i)−minimum bandwidth reservation (i))×$R$+minimum bandwidth reservation (i).

2. The method according to claim 1 wherein said ratio is:
proportional to the difference (DB') between the sum of the reserved bandwidth of all virtual channel connections (a, b, c, d) and the new bandwidth available for the bandwidth adjustable virtual path connection;
inversely proportional to the sum (C+D−E) of the bandwidth reserved above the minimum reservation for the bandwidth adjustable virtual channel connections (d).

3. The method according to anyone of the preceding claims wherein if said new bandwidth (new_H) is lower than the current bandwidth (H) allocated to the bandwidth adjustable virtual path connection, said step of adjusting the bandwidth comprises the step of:
removing, first, from non reserved virtual channel connections (d), the non reserved bandwidth allocated above the minimum reservation.

4. The method according to claims 1 or 2 wherein if said new bandwidth (new_H) is lower than the minimum reservation, said step of adjusting comprises the further step of:
preempting virtual channel connections, preferably, first non reserved virtual channel connection with minimum reservation (d), secondly bandwidth adjustable virtual channel connections (c).

5. The method according to claims 1 or 2 wherein if said new bandwidth (new_H) is higher than the current bandwidth allocated to the bandwidth adjustable virtual path connection, said step of adjusting the bandwidth comprises the further step of:
sharing the additional bandwidth among:
first, bandwidth adjustable virtual channel connections (c) and
second, non reserved virtual channel connections (d).

6. The method according to claims 1 or 2 wherein said step of receiving a notification comprises the steps of:
receiving a resource management message from said bandwidth adjustable virtual path connection;
extracting the new available bandwidth (new_H) from the resource management message.

7. The method according to claims 1 or 2 wherein:
the packet or cell switching network is an Asynchronous Transfer Mode (ATM) network;
said resource management message is a RM-cell;
reserved virtual channel connections are continuous bit rate or variable bit rate virtual channel connections (CBR or VBR VCCs);
non reserved virtual channel connections with minimum reservation are available bit rate virtual channel connections (ABR VCCs);
totally non reserved virtual channel connections are unspecified bit rate virtual channel connections (UBR VCCs).
the bandwidth adjustable virtual path connection is an available bit rate virtual path connection (ABR VPC) or a bandwidth adjustable continuous bit rate virtual path connection (CBR VPC).

8. The method according to claims 1 or 2 wherein:
the packet or cell switching network comprises a backbone network and a plurality of access networks, each network comprising a plurality of nodes and transmission links;
the bandwidth adjustable virtual path connection is established over the backbone network between two nodes located in two different access networks.

9. A system for carrying out the method according to claims 1 or 2.

10. A node comprising the system according to claim 9.

* * * * *